US012342144B2

(12) United States Patent
French

(10) Patent No.: US 12,342,144 B2
(45) Date of Patent: *Jun. 24, 2025

(54) ACOUSTIC TRANSDUCER SYSTEMS AND METHODS OF OPERATING ACOUSTIC TRANSDUCER SYSTEMS FOR OPTIMIZING BARGE-IN PERFORMANCE

(71) Applicant: Audera Acoustics Inc., Richmond Hill (CA)

(72) Inventor: John B. French, Port Carling (CA)

(73) Assignee: Audera Acoustics Inc., Richmond Hill (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,236

(22) Filed: Apr. 22, 2024

(65) Prior Publication Data

US 2024/0276153 A1 Aug. 15, 2024

Related U.S. Application Data

(63) Continuation of application No. 17/851,089, filed on Jun. 28, 2022, now Pat. No. 11,997,466, which is a continuation of application No. 17/188,361, filed on Mar. 1, 2021, now Pat. No. 11,405,729.

(51) Int. Cl.
*H04R 9/06* (2006.01)
*H04R 3/00* (2006.01)
(Continued)

(52) U.S. Cl.
CPC ............ *H04R 9/046* (2013.01); *H04R 3/002* (2013.01); *H04R 3/007* (2013.01); *H04R 3/04* (2013.01);
(Continued)

(58) Field of Classification Search
CPC ...... H04R 1/2834; H04R 3/002; H04R 3/007; H04R 3/04; H04R 3/08; H04R 9/025;
(Continued)

(56) References Cited

U.S. PATENT DOCUMENTS

| | | | |
|---|---|---|---|
| 5,588,065 | A | 12/1996 | Tanaka et al. |
| 9,438,998 | B2 | 9/2016 | French |

(Continued)

FOREIGN PATENT DOCUMENTS

| | | | |
|---|---|---|---|
| EP | 3734994 | A1 | 11/2020 |
| EP | 3846496 | A1 | 7/2021 |
| WO | 2020035812 | A1 | 2/2020 |

OTHER PUBLICATIONS

International Search Report and Written Opinion, dated May 13, 2022, PCT Application No. PCT/CA2022/050269, 7 pages.

*Primary Examiner* — Huyen D Le
(74) *Attorney, Agent, or Firm* — SMART & BIGGAR LP

(57) ABSTRACT

Acoustic transducer systems and methods of operating acoustic transducer systems are provided. The methods can involve: receiving an input audio signal; determining a position of a diaphragm; determining a correction factor, a motor force factor, a spring error factor, and a system spring factor based at least on the position of the diaphragm; determining a corrected voice coil current based at least on the input audio signal, the correction factor, the spring error factor, and a velocity of the diaphragm; and applying a corrected audio signal to a voice coil fixed to the diaphragm based at least on the corrected voice coil current, wherein the corrected audio signal corrects the input audio signal to compensate for non-linear characteristics of the acoustic transducer system.

14 Claims, 11 Drawing Sheets

(51) Int. Cl.

| | |
|---|---|
| ***H04R 3/04*** | (2006.01) |
| ***H04R 3/08*** | (2006.01) |
| ***H04R 9/02*** | (2006.01) |
| ***H04R 9/04*** | (2006.01) |
| ***H04R 29/00*** | (2006.01) |

(52) U.S. Cl.
CPC ............... *H04R 3/08* (2013.01); *H04R 9/025* (2013.01); *H04R 9/043* (2013.01); *H04R 9/06* (2013.01); *H04R 9/063* (2013.01); *H04R 29/001* (2013.01); *H04R 29/003* (2013.01)

(58) Field of Classification Search
CPC .......... H04R 9/043; H04R 9/046; H04R 9/06; H04R 9/063; H04R 29/001; H04R 29/003
See application file for complete search history.

(56) References Cited

U.S. PATENT DOCUMENTS

| | | | | |
|---|---|---|---|---|
| 9,992,596 | B2 | 6/2018 | Russell et al. | |
| 10,034,109 | B2 | 7/2018 | Russell | |
| 10,542,361 | B1 * | 1/2020 | Lazar | H04R 3/04 |
| 10,602,288 | B1 | 3/2020 | French | |
| 10,667,040 | B1 | 5/2020 | French | |
| 10,979,801 | B2 | 4/2021 | Fallon | |
| 11,405,729 | B1 | 8/2022 | French | |
| 2015/0124982 | A1 | 5/2015 | Berthelsen et al. | |
| 2016/0157035 | A1 | 6/2016 | Russell et al. | |
| 2017/0171662 | A1 * | 6/2017 | Russell | H04R 9/06 |
| 2018/0255397 | A1 | 9/2018 | Proksa et al. | |
| 2019/0098416 | A1 * | 3/2019 | French | H04R 9/06 |
| 2021/0204081 | A1 | 7/2021 | French | |

* cited by examiner

ACOUSTIC TRANSDUCER SYSTEMS AND METHODS OF OPERATING ACOUSTIC TRANSDUCER SYSTEMS FOR OPTIMIZING BARGE-IN PERFORMANCE

CROSS-REFERENCE TO RELATED APPLICATIONS

This application is a continuation of U.S. application Ser. No. 17/851,089 filed on Jun. 28, 2022, which is a continuation of U.S. application Ser. No. 17/188,361 filed on Mar. 1, 2021 (now U.S. Pat. No. 11,405,729), the complete disclosures of which are incorporated herein by reference.

FIELD

The described embodiments relate to acoustic transducer systems and methods of operating acoustic transducer systems.

BACKGROUND

The following is not an admission that anything discussed below is part of the prior art or part of the common general knowledge of a person skilled in the art.

Acoustic transducer systems can convert electrical audio signals into acoustic audio signals (i.e., sound). An acoustic transducer system can include a voice coil that receives an audio signal. The audio signal can cause the voice coil to move a diaphragm coupled to the voice coil. The movement of the diaphragm can generate acoustic waves. Various non-linear characteristics of the acoustic transducer system can cause distortions in the sound output. As a result, the sound generated by the acoustic transducer system may differ from the intended sound represented by the audio signal.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with some embodiments, there is provided an acoustic transducer system. The acoustic transducer system includes: a driver magnetic structure, a voice coil, a diaphragm, and a controller. The driver magnetic structure is operable to generate a magnetic flux. The voice coil is operable to move in response to the magnetic flux. The diaphragm is fixed to the voice coil and operable to generate sound when moved. The controller is in electronic communication with the voice coil and operable to: receive an input audio signal; determine a position of the diaphragm; determine a correction factor, a motor force factor, a spring error factor, and a system spring factor based at least on the position of the diaphragm; determine a corrected voice coil current based at least on the input audio signal, the correction factor, the spring error factor, and a velocity of the diaphragm; and apply a corrected audio signal to the voice coil based at least on the corrected voice coil current, wherein the corrected audio signal corrects the input audio signal to compensate for non-linear characteristics of the acoustic transducer system.

In some embodiments, the controller may be operable to determine the velocity of the diaphragm based at least on the corrected voice coil current and the system spring factor.

In some embodiments, the controller may be operable to: determine a corrected voice coil voltage based at least on at least the corrected voice coil current, the motor force factor, and the velocity of the diaphragm; and apply the corrected voice coil voltage to the voice coil as the corrected audio signal.

In some embodiments, the controller may be operable to: determine the corrected voice coil current based at least on the input audio signal, the correction factor, the spring error factor, and the velocity of the diaphragm; and apply the corrected voice coil current to the voice coil as the corrected audio signal.

In some embodiments, the system may further include a position sensor in electronic communication with the controller and operable to measure the position of the diaphragm. The controller may be operable to receive the position of the diaphragm from the position sensor.

In some embodiments, the controller may be operable to calculate the position of the diaphragm based at least on the velocity of the diaphragm and a previous position of the diaphragm.

In some embodiments, the controller may be operable to: determine that the position of the diaphragm is outside of a predetermined position limit; determine a derivative error term associated with the position of the diaphragm; and determine the corrected voice coil current based at least on the correction factor, the system spring factor, the predetermined position limit, and the derivative error term.

In some embodiments, the controller may be operable to: receive a plurality of motor force factor values, each motor force factor value associated with a position of the diaphragm; determine a multiplicative inverse for the plurality of motor force factor values; determine a polynomial fit for the multiplicative inverse of the plurality of motor force factor values; determine a multiplicative inverse of the polynomial fit; and determine the motor force factor based at least on the multiplicative inverse of the polynomial fit and the position of the diaphragm.

In some embodiments, the controller may be operable to determine the correction factor based at least on the multiplicative inverse of the polynomial fit and the motor force factor value associated with an initial position of the diaphragm.

In some embodiments, the controller may be operable to: receive a subsequent input audio signal; determine a subsequent position of the diaphragm; determine a subsequent correction factor, a subsequent motor force factor, a subsequent spring error factor, and a subsequent system spring factor based at least on the subsequent position of the diaphragm; determine a subsequent corrected voice coil current based on the subsequent input audio signal, the subsequent correction factor, the subsequent spring error factor, the previous velocity of the diaphragm, and the previous position of the diaphragm; determine a subsequent velocity of the diaphragm based at least on the subsequent corrected voice coil current, the subsequent system spring factor, the previous motor force factor, the previous velocity of the diaphragm, and the previous position of the diaphragm; and apply a subsequent corrected audio signal to the voice coil based at least on the subsequent corrected voice coil current.

In some embodiments, the controller may be operable to determine the subsequent spring error factor based at least on the previous system spring factor and the subsequent correction factor.

In some embodiments, the controller may be operable to determine the system spring factor based at least on an enclosure spring factor and a suspension spring factor.

In some embodiments, the system may further include a passive diaphragm operable to move and generate sound in response to the movement of the diaphragm fixed to the voice coil. The controller may be operable to: determine a position of the passive diaphragm; determine a coupling spring factor based at least on the position of the diaphragm and the position of the passive diaphragm; and determine the velocity of the diaphragm based at least on the corrected voice coil current, the system spring factor, and the coupling spring factor.

In some embodiments, the system may further include a position sensor in electronic communication with the controller and operable to measure the position of the passive diaphragm. The controller may be operable to receive the position of the passive diaphragm from the position sensor.

In some embodiments, the controller may be operable to: calculate the position of the passive diaphragm based at least on a velocity of the passive diaphragm and a previous position of the passive diaphragm.

In some embodiments, the controller may be operable to: determine a system spring factor for the passive diaphragm based at least on the position of the passive diaphragm; and determine the velocity of the passive diaphragm based at least on the system spring factor for the passive diaphragm and the coupling spring factor.

In some embodiments, the controller may be operable to: determine the system spring factor for the passive diaphragm based at least on an enclosure spring factor for the passive diaphragm and a suspension spring factor for the passive diaphragm.

In accordance with some embodiments, there is provided a method of operating an acoustic transducer system. The method involves: receiving an input audio signal; determining a position of a diaphragm; determining a correction factor, a motor force factor, a spring error factor, and a system spring factor based at least on the position of the diaphragm; determining a corrected voice coil current based at least on the input audio signal, the correction factor, the spring error factor, and a velocity of the diaphragm; and applying a corrected audio signal to a voice coil fixed to the diaphragm based at least on the corrected voice coil current, wherein the corrected audio signal corrects the input audio signal to compensate for non-linear characteristics of the acoustic transducer system.

In some embodiments, the method may further involve determining the velocity of the diaphragm based at least on the corrected voice coil current and the system spring factor.

In some embodiments, the method may further involve: determining a corrected voice coil voltage based at least on at least the corrected voice coil current, the motor force factor, and the velocity of the diaphragm; and applying the corrected voice coil voltage to the voice coil as the corrected audio signal.

In some embodiments, the method may further involve: determining the corrected voice coil current based at least on the input audio signal, the correction factor, the spring error factor, and the velocity of the diaphragm; and applying the corrected voice coil current to the voice coil as the corrected audio signal.

In some embodiments, determining the position of the diaphragm may involve measuring, using a position sensor, the position of the diaphragm.

In some embodiments, determining the position of the diaphragm may involve calculating the position of the diaphragm based at least on the velocity of the diaphragm and a previous position of the diaphragm.

In some embodiments, the method may further involve: determining that the position of the diaphragm is outside of a predetermined position limit; determining a derivative error term associated with the position of the diaphragm; and determining the corrected voice coil current based at least on the correction factor, the system spring factor, the predetermined position limit, and the derivative error term.

In some embodiments, wherein determining the motor force factor may involve: receiving a plurality of motor force factor values, each motor force factor value associated with a position of the diaphragm; determining a multiplicative inverse for the plurality of motor force factor values; determining a polynomial fit for the multiplicative inverse of the plurality of motor force factor values; determining a multiplicative inverse of the polynomial fit; and determining the motor force factor based at least on the multiplicative inverse of the polynomial fit and the position of the diaphragm.

In some embodiments, determining the correction factor may involve determining the correction factor based at least on the multiplicative inverse of the polynomial fit and the motor force factor value associated with an initial position of the diaphragm.

In some embodiments, the method may further involve: receiving a subsequent input audio signal; determining a subsequent position of the diaphragm; determining a subsequent correction factor, a subsequent motor force factor, a subsequent spring error factor, and a subsequent system spring factor based at least on the subsequent position of the diaphragm; determining a subsequent corrected voice coil current based at least on the subsequent input audio signal, the subsequent correction factor, the subsequent spring error factor, the previous velocity of the diaphragm, and the previous position of the diaphragm; determining a subsequent velocity of the diaphragm based at least on the subsequent corrected voice coil current, the subsequent system spring factor, the previous motor force factor, the previous velocity of the diaphragm, and the previous position of the diaphragm; and applying a subsequent corrected audio signal to the voice coil based at least on the subsequent corrected voice coil current.

In some embodiments, determining the subsequent spring error factor may involve determining the subsequent spring error factor based at least on the previous system spring factor and the subsequent correction factor.

In some embodiments, determining the system spring factor may involve determining the system spring factor based at least on an enclosure spring factor and a suspension spring factor.

In some embodiments, the method may further involve: determining a position of a passive diaphragm operable to move and generate sound in response to the movement of the diaphragm fixed to the voice coil; determining a coupling spring factor based at least on the position of the diaphragm and the position of the passive diaphragm; and determining the velocity of the diaphragm based at least on the corrected voice coil current, the system spring factor, and the coupling spring factor.

In some embodiments, determining the position of the diaphragm may involve: measuring, using a position sensor, the position of the passive diaphragm;

In some embodiments, determining the position of the diaphragm may involve: calculating the position of the passive diaphragm based at least on a velocity of the passive diaphragm and a previous position of the passive diaphragm.

In some embodiments, the method may further involve: determining a system spring factor for the passive diaphragm based at least on the position of the passive diaphragm; and determining the velocity of the passive diaphragm based at least on the system spring factor for the passive diaphragm and the coupling spring factor.

In some embodiments, the method may further involve: determining the system spring factor for the passive diaphragm based at least on an enclosure spring factor for the passive diaphragm and a suspension spring factor for the passive diaphragm.

In accordance with some embodiments, there is provided an acoustic transducer system. The acoustic transducer system includes a driver magnetic structure, a voice coil, a diaphragm, a microphone, and a controller. The driver magnetic structure is operable to generate a magnetic flux. The voice coil is operable to move in response to the magnetic flux. The diaphragm is fixed to the voice coil and is operable to generate sound when moved. The microphone is proximate to the diaphragm. The controller is controller in electronic communication with the voice coil and the microphone and is operable to: receive an input audio signal; determine a position of the diaphragm; determine a correction factor, a motor force factor, a spring error factor, and a system spring factor based at least on the position of the diaphragm; determine a corrected voice coil current based at least on the input audio signal, the correction factor, the spring error factor, and a velocity of the diaphragm; determine the velocity of the diaphragm based at least on the corrected voice coil current and the system spring factor; determine an acceleration of the diaphragm based at least on the velocity of the diaphragm; receive a microphone audio signal from the microphone; and generate a corrected microphone signal based at least on the microphone audio signal and the acceleration of the diaphragm, wherein the corrected microphone signal corrects the microphone audio signal to remove the sound generated by diaphragm.

In some embodiments, the controller may be operable to: determine an expected microphone signal based on the acceleration of the diaphragm; compare the received microphone audio signal to the expected microphone audio signal; and adjust at least one parameter used to determine the acceleration of the diaphragm based on a difference between the received microphone audio signal to the expected microphone audio signal.

In some embodiments, adjusting the at least parameter may involve adjusting a zero position of the motor force factor.

In accordance with some embodiments, there is provided a method of operating an acoustic transducer system. The method involves: receiving an input audio signal; determining a position of a diaphragm; determining a correction factor, a motor force factor, a spring error factor, and a system spring factor based at least on a position of the diaphragm; determining a corrected voice coil current based at least on the input audio signal, the correction factor, the spring error factor, and a velocity of the diaphragm; determining the velocity of the diaphragm based at least on the corrected voice coil current and the system spring factor; determining an acceleration of the diaphragm based at least on the velocity of the diaphragm; receiving a microphone audio signal from a microphone proximate to the diaphragm; and generating a corrected microphone signal based at least on the microphone audio signal and the acceleration of the diaphragm, wherein the corrected microphone signal corrects the microphone audio signal to remove the sound generated by diaphragm.

In some embodiments, the method may further involve: determining an expected microphone signal based on the acceleration of the diaphragm; comparing the received microphone audio signal to the expected microphone audio signal; and adjusting at least one parameter used to determine the acceleration of the diaphragm based on a difference between the received microphone audio signal to the expected microphone audio signal.

In some embodiments, adjusting the at least parameter may involve adjusting a zero position of the motor force factor.

BRIEF DESCRIPTION OF THE DRAWINGS

Several embodiments will be described in detail with reference to the drawings, in which.

Figure 1:
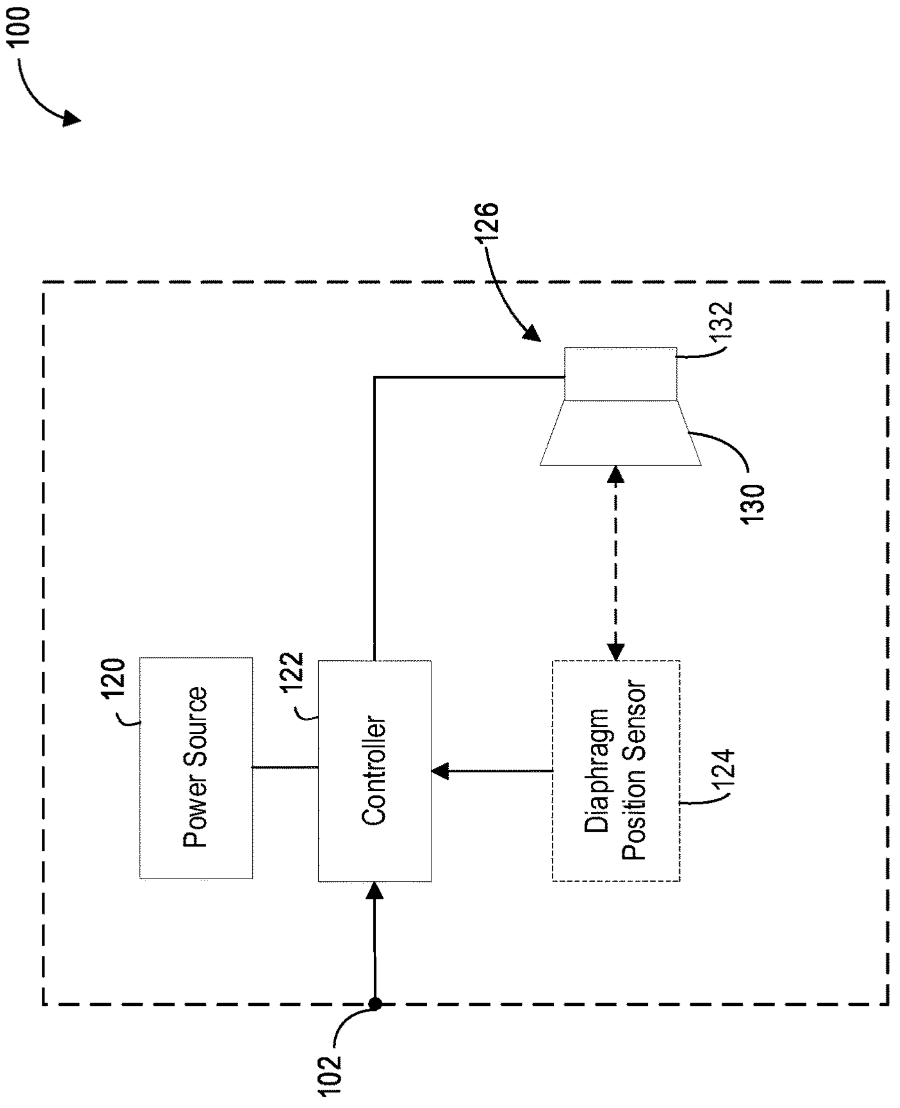
FIG. 1 is a block diagram of an example acoustic transducer system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send signals to another element or device as well as receive signals from another element or device. Furthermore, the term "coupled" may indicate that two elements can be directly coupled to one another or coupled to one another through one or more intermediate elements. The term "coupled" can, in some embodiments, also indicate that the two elements are integrally formed.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Reference is first made to FIG. 1, which illustrates an example acoustic transducer system 100. In the illustrated example, the acoustic transducer system 100 includes a controller 122 and a driver (or driver motor) 126.

The controller 122 can be in electronic communication with the driver 126 and control the operation of the driver 126. In particular, the controller 122 can generate and transmit a control signal to the driver 126. The driver 126 can receive the control signal and generate sound based on the control signal. The controller 122 may be implemented in hardware, or a combination of hardware and software. The hardware may be digital, analog, or a combination thereof.

The controller 122 can receive an input audio signal from an input terminal 102. The input terminal 102 can be coupled to an audio source (not shown) for providing the input audio signal. The input audio signal may be a one volt peak-to-peak signal with a time varying magnitude and a time-varying frequency. In other embodiments, the input audio signal may be any other type of analog or digital audio signal. The controller 122 can generate the control signal based on the input audio signal. For example, the controller 122 may amplify and/or equalize the input audio signal to provide the control signal. In various embodiments, the controller 122 can modify the input audio signal to compensate for non-linear properties of the driver 126.

The driver 126 can include a driver magnetic structure 132 and a diaphragm 130. The driver magnetic structure 132 can generate a magnetic flux. The diaphragm 130 can generate acoustic waves when moved. The diaphragm 130 can be coupled to a voice coil (not shown) so that the diaphragm 130 moves in response to movement of the voice coil. The voice coil can receive the control signal and generate a magnetic flux in response to the received control signal. The magnetic flux generated by the voice coil can cause the voice coil to move in response to the magnetic flux generated by the driver magnetic structure 132, thereby moving the diaphragm 130 to produce sound. The driver 126 may be housed in a driver body (not shown). In some embodiments, the acoustic transducer system 100 can further include a passive radiator (not shown) that is acoustically coupled to the driver 126.

Various non-linear characteristics of the driver 126 can cause distortions in the output audio signal produced by the driver 126. That is, the sound produced by the driver 126 may differ from the intended sound represented by the input audio signal. The non-linear behavior of the driver 126 can be caused by various geometric and material properties of the driver 126. For example, the motor force factor (BL) of the driver 126 may be non-linear. Furthermore, when the driver 126 is housed in a driver body, the stiffness of the air inside the enclosure can contribute to the non-linear behavior of the driver 126.

In some cases, the amount of distortion can depend on the relative position of the diaphragm 130. When the diaphragm 130 is stationary, that is, when no current is flowing through the voice coil, the diaphragm 130 is in an initial, or rest, position. The location of the diaphragm 130 at the initial position relative to the driver magnetic component 132 can vary for different designs of the driver 126. When the diaphragm 130 is in motion, the diaphragm 130 can move relative to the driver magnetic component 132 and the displacement of the diaphragm can correspond to a position of the diaphragm 130 relative to the initial position.

The controller 122 can compensate for the distortions associated with the non-linear characteristics of the driver 126. For example, based on the input audio signal and the position of the diaphragm 130, the controller 122 can generate a control signal that compensates for the distortion. In various embodiments, the controller 122 can determine a corrected control signal based on mathematical models of the driver 126.

In some embodiments, the controller 122 can determine the position of the diaphragm 130 using a position sensor 124 that is in electronic communication with the controller 122. The position sensor 124 can sense and measure the position of the diaphragm 130. Various implementations of the position sensor 124 may be used. For example, the position sensor 124 can be implemented using optical methods (e.g., an optical sensor, such as a laser displacement sensor), or methods involving measurement of electrical capacitance, inductance or mutual coupling that varies with the displacement of the diaphragm 130. The position sensor 124 may also be implemented as an ultrasonic sensor, a magnetic sensor or an acoustic pressure sensor. Another example implementation of the position sensor 124 can include a strain gauge.

Depending on the intended application of the acoustic transducer system 100, optical methods may be impractical since the fabrication processes involved may be too expensive and/or may not be scalable to smaller-scale devices. Strain gauges can operate based on a bulk or piezoelectric property of a component of the driver 126, such as a suspension component or a component at a mechanical interface between components of the driver 126.

It should be appreciated that other implementations of the position sensor 124 may be used. For example, the position sensor 124 can include a low performance zero-cross sensor and an accelerometer or a velocity sensor. The zero-cross sensor can operate to maintain an average DC position, while a double integral of the accelerometer or single integral of the velocity sensor can indicate a movement of the diaphragm 130. The signal from the zero-cross sensor and one of the accelerometer or velocity sensor can be combined. For example, the signals from the zero-cross sensor and one of the accelerometer or velocity sensor can be summed with appropriate filtering and/or scaling. However, a position sensor 124 that directly measures position may be preferable in some embodiments, due to the inaccuracies involved in calculating position from velocity or acceleration.

In other embodiments, the controller 122 can determine the position of the diaphragm 130 using mathematical models of the driver 126. For example, the controller 122 may determine the position of the diaphragm 130 based on the current and/or voltage of the voice coil. In various embodiments, the controller 122 may apply dead reckoning techniques to determine a current position of the diaphragm 130 using a previously determined position of the diaphragm 130. For example, the controller 122 may determine the position of the diaphragm 130 based on the velocity of the diaphragm 130 and the previous position of the diaphragm 130.

The controller 122 can receive electrical power from a power source 120. In some embodiments, the power source 120 may be a current source and provide a current to the controller 122. In other embodiments, the power source 120 may be a voltage source and provide a voltage to the controller 122. The controller 122 can use the current/voltage to generate the control signal based on the input audio signal. For example, the controller 122 may use the current/voltage to amplify the input audio signal to generate the control signal. Additionally or alternatively, the controller 122 may use the current/voltage to modify the input audio signal to compensate for the distortions associated with the driver 126. The power source 120 may be configured to output any current or voltage level.

A voltage source may eliminate the need for a pre-equalizer, as typically required by a current source. During operation of the acoustic transducer system 100, the movement of the voice coil through the magnetic flux generated by the driver motor 132 can generate an opposing voltage to the control signal, which is often referred to a back electromotive voltage. A current source can automatically compensate for the back electromotive voltage, because the current source can provide whatever voltage is required to provide a particular current. However, a current source may require a pre-equalizer to nullify for the rise in response of the driver at resonant frequencies. Nevertheless, the pre-equalizer may not be able to accurately compensate for the rise in response. In contrast, a voltage source cannot automatically compensate for the back electromotive voltage, because the voltage source provides a fixed voltage. However, the back electromotive voltage can effectively cancel the rise in response of the driver 126 at resonant frequencies. In various embodiments, the controller 122 can compensate for the back electromotive voltage when generating the control signal. This may eliminate the need for a pre-equalizer when using a current source since this may also compensate for the rise in response at resonance.

Figure 2:
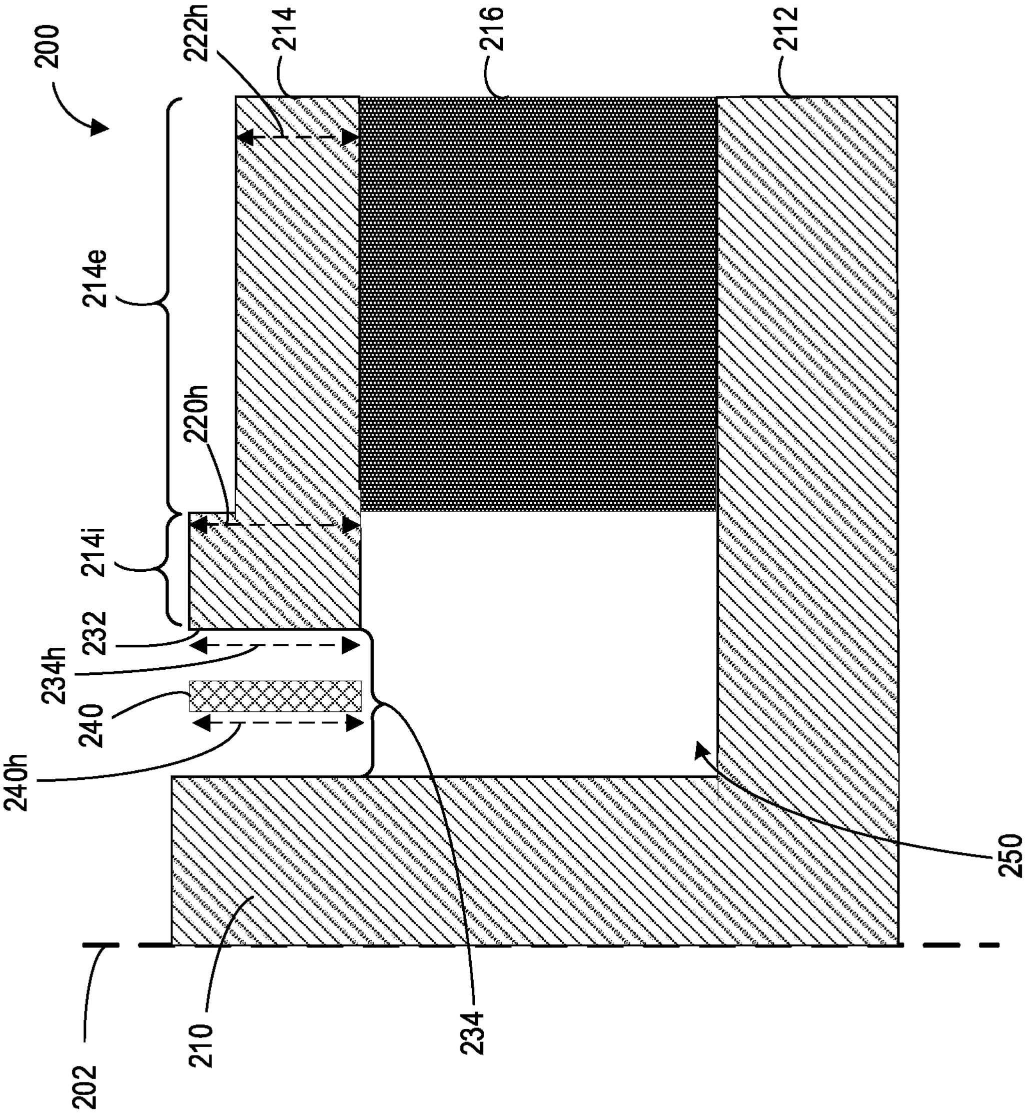
FIG. 2 is a partial cross-sectional view of an example driver motor operable in an acoustic transducer system, in accordance with an embodiment.

Referring now to FIG. 2, there is shown a partial cross-sectional view of an example driver motor 200. A center axis 202 is shown in FIG. 2 for illustrative purposes. In the illustrated example, the driver motor 200 includes an axial post 210, a bottom plate 212 extending away from the axial post 210, and a top plate 214 with an interior surface 232 facing the axial post 210. In the embodiment shown in FIG. 2, the axial post 210 can be referred to as a center post since the axial post 210 is positioned at a substantially central region of the driver motor 200. However, it should be appreciated that the axial post 210 may be positioned differently in other embodiments, for example, forming an outer wall for the driver motor 200.

A magnetic element 216 can be positioned between the bottom plate 212 and the top plate 214 so that the voice coil 240 is positioned within the path of the magnetic flux generated by the magnetic element 216. The magnetic element 216 may be formed from one or more magnetic materials, such as, but not limited to, ferrite, neodymium-iron-boron, and Samarium-cobalt. In some embodiments, the magnetic element 216 may be formed by one or more electromagnets. Each of the center post 210, the bottom plate 212 and the top plate 214 may generally be manufactured from any suitably magnetically permeable materials, such as low carbon steel. Although a single magnetic element 216 is shown in FIG. 2, it should be appreciated that the driver motor 200 can include any number of magnetic elements 216, and each magnetic element 216 may be positioned at different locations.

The top plate 214 and the center post 210 also define an air gap 234 therebetween. The air gap 234 can have a gap height **234*h*. The voice coil 240 can move at least partially within the air gap 234 axially with respect to the driver motor 200. The voice coil 240 can generally move, at least, in response to the magnetic flux generated by the magnetic element 216 and the magnetic flux generated by the current in the voice coil 240. The movement of the voice coil 240 can be varied by the control signal received from the controller 122. The voice coil 240 can be coupled to the diaphragm 130 (not shown in FIG. 2) so that the diaphragm 130 moves in response to movement of the voice coil 240. As voice coil 240 moves with the diaphragm 130, the voice coil can at least partially exit the air gap 234. Some of the non-linear characteristics of the driver motor 200 (and the associated distortions in the audio output) may be attributed to the voice coil exiting 240** the air gap.

The voice coil 240 can have a coil height **240*h*. In the example shown in FIG. 2, the topology of the driver motor 200 is configured in a substantially evenly hung design and so, the coil height 240*h* can substantially correspond to the gap height 234*h*. In some embodiments, the coil height 240*h* may be equal to the gap height 234*h*. In other embodiments, the voice coil 240 may be substantially underhung so that the coil height 240*h* is less than the gap height 234*h*. In other embodiments, the voice coil 240 may be substantially overhung so that the coil height 240*h* is greater than the gap height 234. A smaller coil height 240*h* can increase efficiency, due to the lighter weight and lower resistance associated with a shorter voice coil 240. However, a shorter voice coil 240 can also result in a less linear output audio signal at high displacement. Accordingly, the performance of such designs can be limited by distortions caused by the displacement of the voice coil 240**.

As shown in FIG. 2, the magnetic element 216 can be spaced away from the center post 210 so that a driver cavity 250 can be provided. During movement of the diaphragm 130, the voice coil 240 can at least partially move into the driver cavity 250. The driver cavity 250 can be configured to accommodate the movement of the voice coil 240.

The driver 126 can be configured to accommodate the overall movement of the voice coil 240. In response to the magnetic flux generated by the magnetic element 216 and the current in the voice coil 240, the voice coil 240 will move axially towards and away from the bottom plate 212. The movement of the voice coil 240 can be limited to a displacement range that includes the voice coil 240 at least partially or, in some embodiments, completely above and below the air gap 234. The displacement range can, in some embodiments, correspond to substantially the coil height **240*h* from each end of the air gap 234. The diaphragm 130 and the driver cavity 250**, therefore, can be configured to accommodate the displacement range.

The drivers 126 described herein can involve a driver motor 200 characterized by a center post 210 with a cross-sectional area that is equal or less than an area of the interior surface 232. The top plate 214, therefore, may be formed with generally uniform geometry. However, the geometry of the top plate 214 may be modified to reduce unnecessary use of steel. For example, one or more portions of the top plate 214 may be tapered to reduce the manufacturing cost and weight of the driver motor 200. Furthermore, modifications of the top plate 214, the bottom plate 212 and/or the center post 210 may be applied to increase the linearity of the output audio signal without affecting the overall performance of the acoustic transducer systems 100 described herein. For example, one or more portions of the driver motor 200 may be shaped to accommodate a larger displacement range for the voice coil 240. It should be appreciated that the top plate 214, the bottom plate 212 and/or the center post 210 be shaped in various profiles, depending on the intended application of the acoustic transducer system 100. Furthermore, one or more portions of the driver motor 200 may be integrally formed, in some embodiments.

As shown in FIG. 2, the top plate 214 may include an interior portion **214*i* and an exterior portion 214*e*. The interior portion 214*i* can be formed integrally with the exterior portion 214*e*, in some embodiments. The cross-sectional size of each of the interior portion 214*i* and the exterior portion 214*e* with respect to the overall top plate 214 is illustrated as being only an example and should not be construed as a limitation. The interior portion 214*i* and the exterior portion 214*e* can be sized according to the design requirements of the driver motor 200**.

The interior portion **214*i* can include the interior surface 232, while the magnetic element 216 can be coupled to the top plate 214 at the exterior portion 214*e*. As seen in FIG. 2, the interior portion 214*i* and the exterior portion 214 *e* can have different heights, 220*h* and 222*h*, respectively. To retain the gap height 234***h* while also reducing the amount of steel used, the interior height 220 *h* of the interior portion 214*i* can be higher than the exterior height 222*h* of the exterior portion 214*e*.

Figure 3:
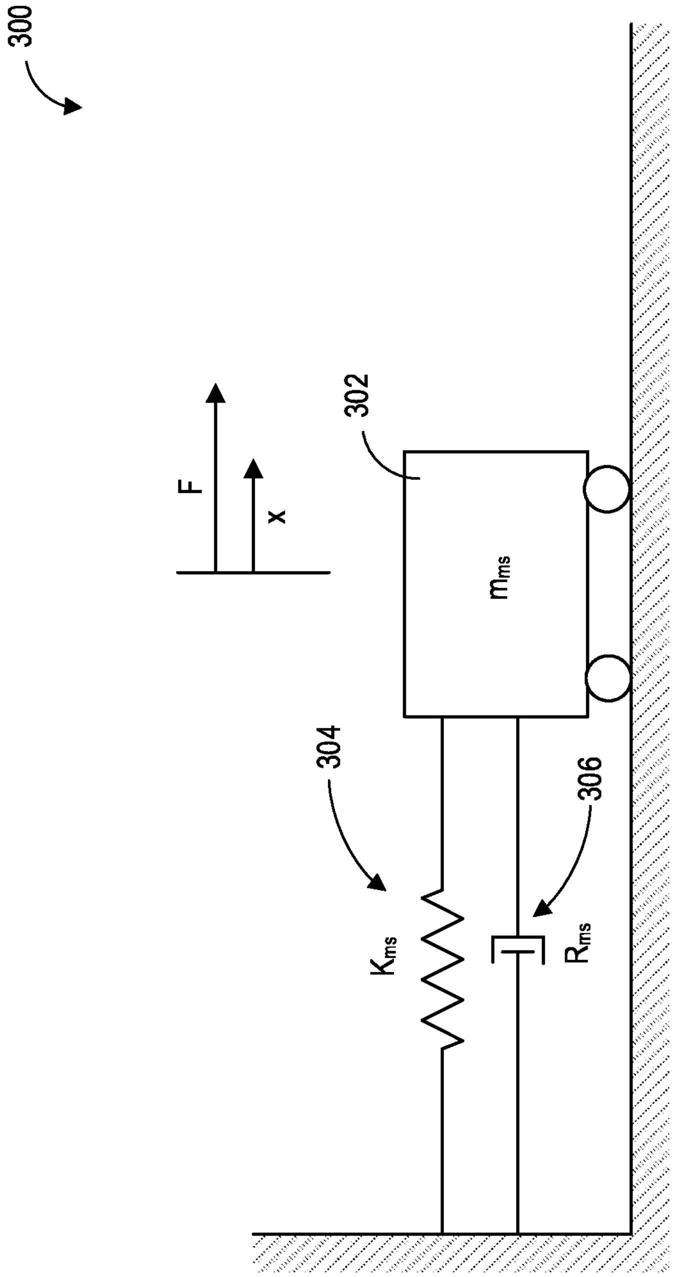
FIG. 3 is a diagram of an example model of an acoustic transducer system, in accordance of an embodiment.

Referring now to FIG. 3, there is shown an example model 300 for a driver 126. As shown, the model 300 can represent the driver 126 as a dampened spring mass system. More specifically, the model 300 can represent the driver 126 as a moving mass 302 having a mass $m_{ms}$, a spring 304 having a spring factor $k_{ms}$, and damper 306 having damping factor $R_{ms}$. The moving mass 302 can represent the mass of the diaphragm 130, the voice coil 240, and the moving air; the spring 304 can represent the stiffness of the diaphragm 130; and the damper 306 can represent the mechanical losses of the driver 126.

During operation of the driver 126, a driving force (i.e., Bl(x) multiplied by the voice current i) is applied to the mass 302 (i.e., when a signal is applied to the voice coil 240 to move the voice coil 240), causing the mass 302 to be displaced. When the mass 302 is displaced from its initial or rest position, the spring 304 applies an opposing restoring force to the mass 302, urging the mass 302 back towards the initial position. Both the driving force and the restoring force are damped by the damper 306.

The balance of forces for the driver 126 can be represented by the follow equation:

$$Bl(x)i = m_{ms}\frac{d^2x}{dt^2} + R_{ms}\frac{dx}{dt} - \frac{1}{2}\frac{dL_{vc}}{dx}i^2 + K_{ms}(x)x$$

where Bl(x) is the motor force factor;
- i is the current applied to the voice coil;
- $m_{ms}$ is the mass of the moving mass, including the voice coil, the diaphragm and the moving air mass;
- x is the position of the diaphragm;
- t is time;
- $R_{ms}$ is the damping factor of the damper;
- $L_{vc}$ is the inductance of the voice coil;
- $R_{vc}$ is the resistance of the voice coil; and
- $K_{ms}$ is the spring factor of the spring.

Likewise, the balance of voltages for the driver 126 can be represented by the following equation:

$$U = R_{vc} + \frac{Bl(x)dx}{dt} + \frac{d[L_{vc}i(t)]}{dt}$$

where U is the voltage of the voice coil;
- $R_{vc}$ is the resistance of the voice coil;
- Bl(x) is the motor force factor;
- x is the position of the diaphragm;
- t is time;
- $L_{vc}$ is the inductance of the voice coil; and
- i is the current of the voice coil.

The above equations can be rearranged and combined with other equations to solve for various aspects of the acoustic transducer system 100. In various embodiments, the model 300 and above equations can be modified to take into consideration the non-linear characteristics of the acoustic transducer system 100. For example, the model 300 can be modified such that the spring 304 has a stiffness that represents the non-linear stiffness of the air inside an enclosure housing the driver 126, in addition to the stiffness of the suspension for the diaphragm 130.

Figure 4:
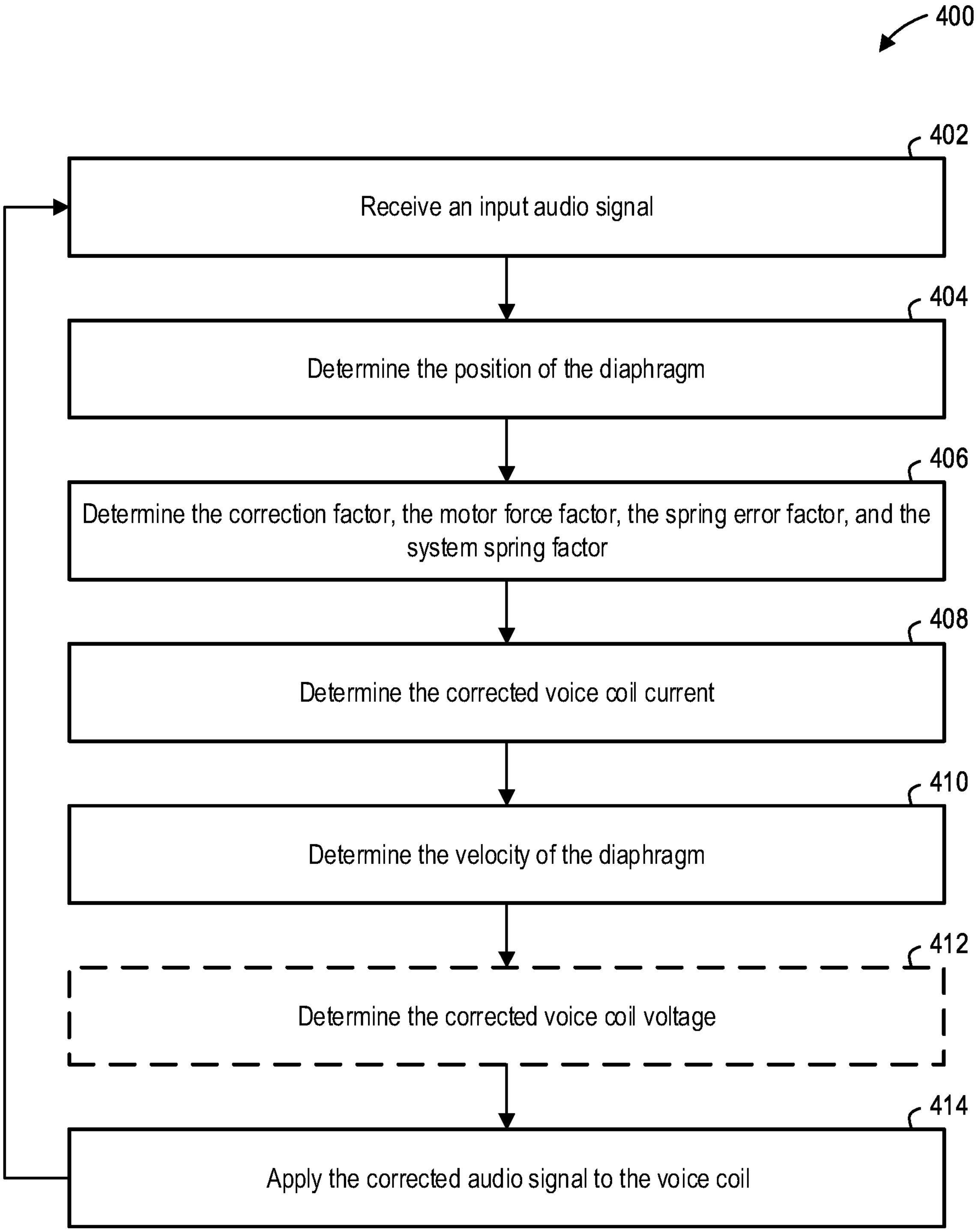
FIG. 4 is a flow chart of an example method of operating an acoustic transducer system, in accordance with an embodiment.

Referring now to FIG. 4, there is shown an example method 400 for operating an acoustic transducer system 100. The method 400 can be used to produce output audio signals that compensate for the distortions associated with non-linear characteristics of the acoustic transducer system 100. The method 400 can involve determining various parameters of the acoustic transducer system 100 based on a model 300 of the driver 126.

In some embodiments, one or more of the parameters may be pre-calculated and stored, prior to the execution of the method 400. This may reduce the amount of processing required during execution of the method 400. For example, one or more of the parameters may be stored in a look-up table. In other embodiments, the parameters can be calculated during the execution of the method 400.

As shown, the method 400 includes steps 402 to 414. In various embodiments, the method 400 can be iterative so that steps 402 to 414 are executed more than once. That is, subsequent to performing steps 402 to 414, the method 400 can involve performing steps 402 to 414 yet again. Each iteration can be executed during a time step n, having a time span dt. Accordingly, the method 400 can be executed at a frequency of 1/dt. The frequency and timespan can vary depending on the intended application of the particular acoustic transducer system 100. In some embodiments, the frequency can be greater than the maximum frequency response of the acoustic transducer system 100. In some embodiments, the frequency can be greater than the resonant frequency of the acoustic transducer system 100. In some embodiments, the frequency can be greater than the sampling rate of the input audio signal. For example, the frequency may be 3 or 4 times greater than a standard sampling rate of 48 KHz. However, in other embodiments, the frequency may be as low as 12 to 18 KHz.

As will be described below, the method 400 can involve determining various parameters of the acoustic transducer system 100 associated with the current iteration (e.g., time step n) based on one or more parameters associated with to a previous iteration (e.g., time step n−1). During the first iteration, one or more of the parameters may be initially assigned a predetermined assumed value (since there is no previous iteration and time step). For example, during the first iteration, the velocity of the diaphragm 130 may initially be assumed to be zero. However, during subsequent iterations, the velocity of the diaphragm 130 may be determined based on at least one parameter determined during the previous iteration.

As shown, the method 400 can begin at 402. At 402, a controller 122 can receive an input audio signal. For example, the controller 122 can receive an audio signal from an input terminal 102 that is coupled to an audio source.

At 404, the controller 122 can determine the positon of the diaphragm 130. In some embodiments, the controller 122 can receive the position of the diaphragm 130 from a position sensor 124. In other embodiments, the controller 122 can calculate the position of the diaphragm 130. In some embodiments, the controller 122 can determine the position of the diaphragm 130 based on a previously calculated position of the diaphragm 130. In some embodiments, during the first iteration, the controller 122 can assume that the position of the diaphragm 130 is at the initial/rest position (i.e., zero).

At 406, the controller 122 can determine a motor force factor. The motor force factor can be determined based on the position of the diaphragm 130. In some embodiments, the motor force factor can be determined based on a set of previously acquired motor force factor values. The set of motor force factor values may be generated using simulations or collected by conducting actual measurements. In some embodiments, the motor force factor can be determined based on a model of the previously acquired motor force factor values. For example, the model may be a regression of the set of motor force factor values, such as a polynomial fit.

In some embodiments, the model may be a multiplicative inverse of a polynomial fit of a multiplicative inverse of a plurality of motor force factor values. For example, the controller 122 can receive a plurality of motor force factor values, each motor force factor value associated with a position of the diaphragm 130 (e.g., Bl(x)). The controller 122 can determine a multiplicative inverse for the plurality of motor force factor values (e.g., 1/Bl(x)). The controller 122 can then determine a polynomial fit for the multiplicative inverse of the plurality of motor force factor values (e.g., poly(1/Bl(x))). The controller 122 can then determine a multiplicative inverse of the polynomial fit (e.g., 1/poly (1/Bl(x))), and determine the motor force factor based on the multiplicative inverse of the polynomial fit and the position of the diaphragm 130.

Figure 5:
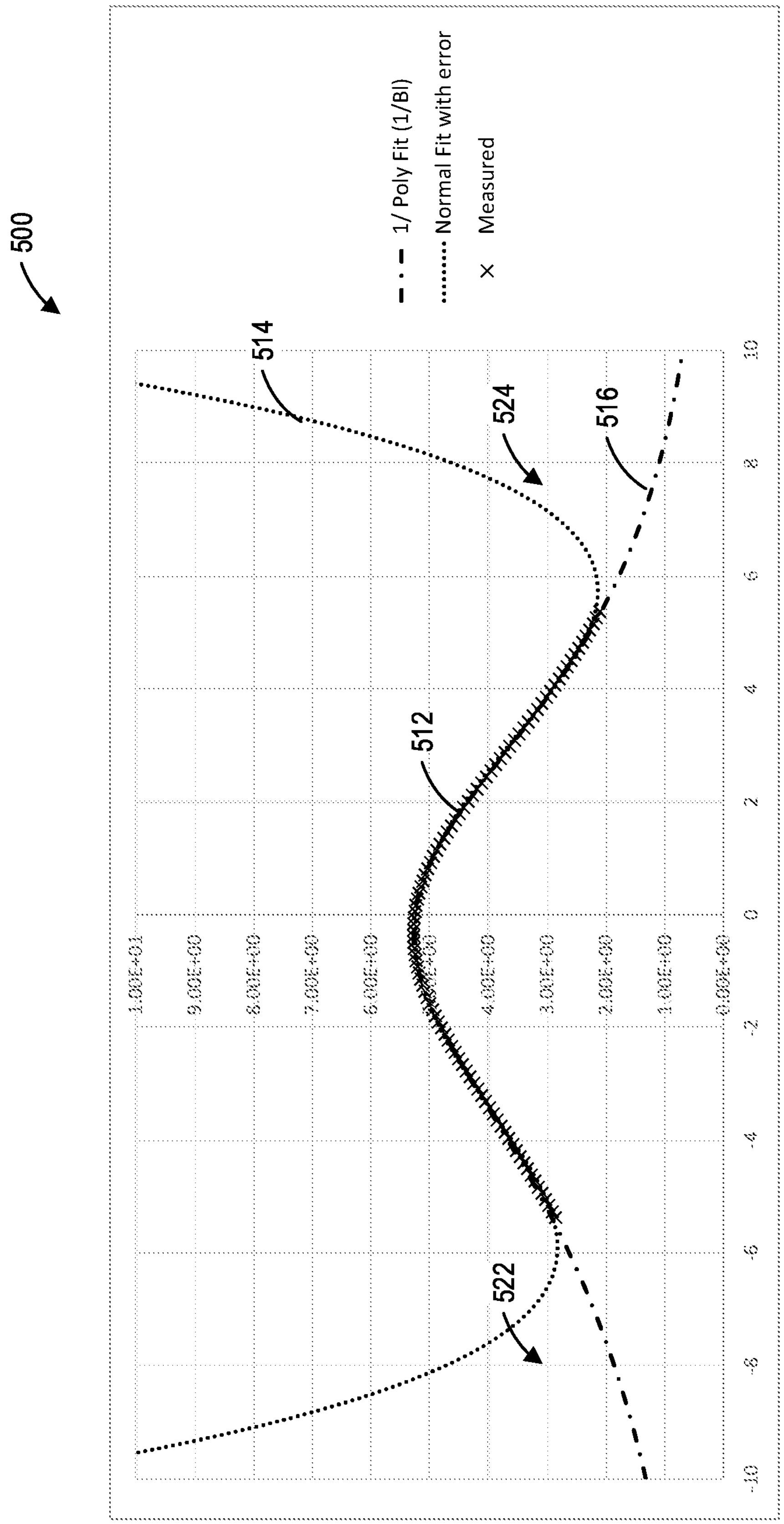
FIG. 5 is a graph of the motor force factor associated with an acoustic transducer system, in accordance with an embodiment.

Referring now to FIG. 5, there is shown a graph 500 of motor force factor values associated with an acoustic transducer system 100. The graph 500 includes data series 512, 514, and 516. As shown, data series 512 represents a set of measured motor force factor values; data series 514 represents a polynomial fit of the set of measured motor force factor values, and data series 516 represents a multiplicative inverse of a polynomial fit of a multiplicative inverse of the set of measured motor force factor values. As shown in FIG. 5, both the polynomial fit (i.e., data series 514) and the inverse polynomial fit (i.e., data series 514) can accurately model the motor force factor within the range of diaphragm positions for the measured motor values (i.e., data series 512). However, the polynomial fit may be less accurate at modeling the motor force factor as compared to the inverse polynomial fit at positions of the diaphragm 130 where motor force values were not measured, such as at regions 522 and 524. Accordingly, the inverse polynomial fit may provide a more accurate model of the motor force factor.

Referring back to FIG. 4, at 406, the controller 122 can also determine a correction factor. The correction factor can be determined based on the positon of the diaphragm 130. In particular, the correction factor can be determined based on the model of the motor force factor, the current position of the diaphragm 130, and the initial positon of the diaphragm 130. In various embodiments, the correction factor can be determined based on the motor force factor corresponding to the current position of the diaphragm 130 and the motor force factor corresponding to the initial position of the diaphragm 130. For example, the correction factor can be determined using the following equation:

$$\text{Correction} = Bl(0)/Bl(x)$$

where Correction is the correction factor;

Bl(x) is the motor force factor corresponding to the current position of the diaphragm 130; and Bl(0) is the motor force factor corresponding to the initial position of the diaphragm 130.

In various embodiments, the correction factor can be determined based on a model of the motor force factor, such as a multiplicative inverse of a polynomial fit of a multiplicative inverse of a plurality of motor force factor values. For example, the correction factor can be determined using the following equation:

$$\text{Correction} = Bl(0) * poly(1/Bl(x))$$

Figure 6:
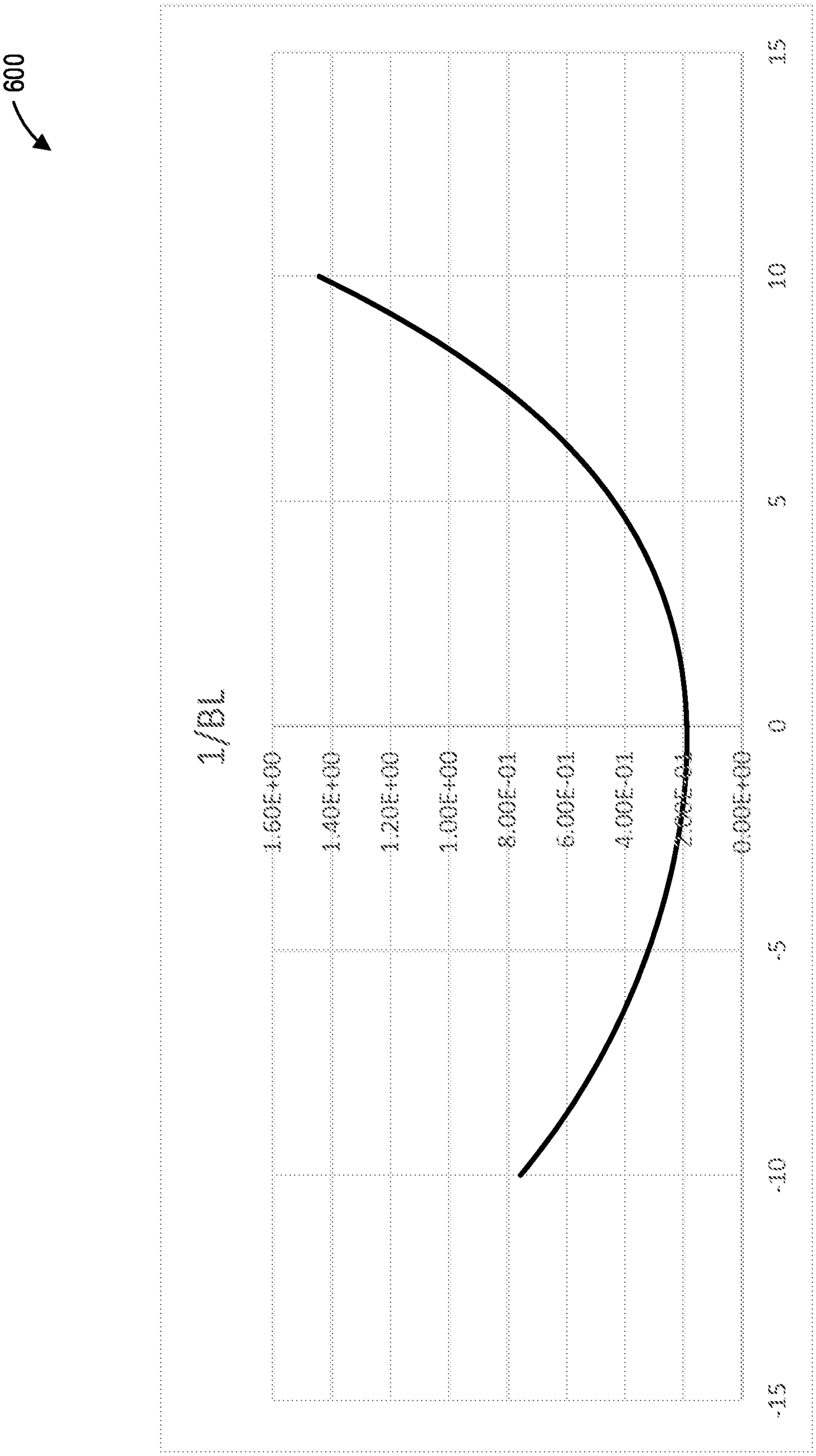
FIG. 6 is a graph of the correction factor associated with an acoustic transducer system, in accordance with an embodiment.

Referring to FIG. 6, there is shown a graph 600 of correction factor values associated with an acoustic transducer system 100. The graph 600 can be generated based on data series 516 in FIG. 5. In particular, the graph 600 can be generated by dividing the motor force factor value corresponding to the initial position of the diaphragm 130 by each motor force factor value in data series 516.

In some embodiments, during the first iteration, the controller 122 can assume that the correction factor is approximately one, since the position of the diaphragm 130 can be initially assumed to be approximately zero.

Referring back to FIG. 4, at 406, the controller 122 can also determine a spring error factor. The spring error factor can be determined based on the position of the diaphragm 130. In some embodiments, the spring error factor can be determined based on the system spring factor, the correction factor and the motor force factor. For example, the spring error factor can be determined using the following equation:

$$K_{error} = (K_{system}(x_{n-1}) - K_{system}(0)) * \text{Correction}/Bl(0)$$

where $K_{system}$ $(x_{n-1})$ is the system spring factor corresponding to a previous position of the diaphragm 130;

$K_{system}$ (0) is the system spring factor corresponding to the initial position of the diaphragm 130;

Correction is the correction factor; and

Bl(0) is the motor force factor corresponding to the initial position of the diaphragm 130.

In some embodiments, during the first iteration, the controller 122 can assume that the previous position of the diaphragm 130 is the initial/rest position (i.e., zero), and therefore the spring error factor is approximately zero. During subsequent iterations, the controller 122 can determine the subsequent spring error factor based on previous system spring factor and the subsequent correction factor.

At 406, the controller 122 can also determine the system spring factor. The system spring factor can be determined based on the position of the diaphragm 130. The system spring factor can be determined based on the enclosure spring factor (i.e., corresponding to the stiffness of the air in the enclosure) and the suspension spring factor (i.e., corresponding to the stiffness of the diaphragm 130). For example, the system spring factor can be determined using the following equation:

$$K_{system} = K_{enclosure} + K_{ms}$$

where $K_{enclosure}$ is the enclosure spring factor; and $K_{ms}$ is the suspension spring factor.

The enclosure spring factor can be determined based on the volume of the enclosure. For example, the enclosure spring factor can be determined using the following equation:

$$K_{enclosure} = S_d^2 * c^2 * \mathrm{Roe}_0/\mathrm{Volume}_{enclosure}(x_{n-1})$$

where $S_d$ is the surface area of the diaphragm 130;

c is the speed of sound.

$Roe_0$ is the density of air; and $Volume_{enclosure}$ $(x_{n-1})$ is the volume of the enclosure corresponding to the previous position of the diaphragm 130.

The volume of the enclosure can be determined based on the position of the diaphragm. For example, the volume of the enclosure can be calculated using the following equation:

$$\mathrm{Volume}_{enclosure}(x_{n-1}) = \mathrm{Volume}_{enclosure}(x=0) + S_d * x_{n-1}$$

where $Volume_{enclosure}$ $(x_{n-1})$ is the volume of the enclosure corresponding to the previous position of the diaphragm 130;

$Volume_{enclosure}$ $(x_{n-1})$ is the volume of the enclosure corresponding to the initial position of the diaphragm 130;

$S_d$ is the surface area of the diaphragm 130; and $x_{n-1}$ is the previous position of the diaphragm 130.

The suspension spring factor can be determined based on a set of previously acquired suspension force factor values. The set of suspension force factor values may be collected using simulations or by conducting actual measurements. In some embodiments, the suspension force factor values can be determined based on a model of the previously acquired suspension force factor values. For example, the model may be a regression of the set of suspension force factor values, such as a polynomial fit.

In some embodiments, the suspension force factor can be determined based on a plurality of suspension force values, each motor suspension force value associated with a position of the diaphragm 130. For example, the suspension force can be determined using the following equation:

$$K_{ms} = \frac{F_{ms}}{x}$$

where $K_{ms}$ is the suspension spring factor;

$F_{ms}$ is the suspension force; and x is the position of the diaphragm 130.

At 408, the controller 122 can determine the corrected voice coil current. The corrected voice coil current can represent a desired, or ideal current to be applied to the voice coil 240. The corrected voice current can compensate for the non-linear characteristics of the acoustic transducer system 100, as well as the back electromotive voltage.

The corrected voice coil current can be determined based on the input audio signal, the correction factor, the spring error factor, and the velocity of the diaphragm. For example, the corrected voice coil current can be determined using the following equation:

$$I_{vc} = \mathrm{Correction} * \frac{\mathrm{Audio}_{in} - Bl(0) * \mathrm{Velocity}_{n-1}}{R_{vc}} + K_{error} * x_{n-1}$$

where $I_{vc}$ is the corrected voice coil current;

Correction is the correction factor;

$Audio_{in}$ is the input audio signal;

Bl(0) is the motor force factor corresponding to the initial position of the diaphragm 130;

$Velocity_{n-1}$ is the velocity of the diaphragm 130 corresponding to the previous position of the diaphragm 130;

$K_{error}$ is the spring error factor; and $x_{n-1}$ is the previous position of the diaphragm 130.

In the above equation, the correction factor and spring error terms generally compensate for the non-linearities of the acoustic transducer system 100, and the velocity and motor force factor terms generally compensate for the back electromotive voltage.

If the corrected voice coil current is determined without accounting for the back electromotive voltage (i.e., the above equation without subtracting the velocity and motor force factor terms) an equalization filter may be required to apply the corrected voice coil current using a current source to account for the rise in response at resonance.

In some embodiments, during the first iteration, the controller 122 can assume that the previous position of the diaphragm 130 is the initial/rest position (i.e., zero) and the previous velocity of the diaphragm 130 is approximately zero. During subsequent iterations, the controller 122 can determine the previous position and previous velocity of the diaphragm 130 based on the previous iteration.

In some embodiments, prior to determining the corrected voice coil current, the controller 122 can first determine whether the position of the diaphragm 130 is outside of a predetermined limit. If the position of the diaphragm 130 is within the predetermined limit, the controller 122 can determine the voice coil current as described above.

However, if the position of the diaphragm 130 is outside of the predetermined limit, the controller 122 can determine a derivative error term associated with the position of the diaphragm 130. The derivative error term may be the rate of change of the extent to which the position of the diaphragm 130 exceeds the predetermined limit. The derivative error term may be determined by a proportional-integral-derivative controller of the controller 122. The controller 122 can then determine the corrected voice coil current based on the input audio signal, the correction factor, the system spring factor, the predetermined position limit, and the derivative error term. For example, the corrected voice current can be determined using the following equation:

$$I_{vc} = K_{system} * \mathrm{Limit} * p_1 * \mathrm{Correction} + (\mathrm{Limit} - X_n) * p_2 - d_1 * \mathrm{Velocity}_n$$

where $I_{vc}$ is the corrected voice coil current;

$K_{system}$ is the system spring factor.

Limit is the predetermined limit for the position of the diaphragm 130;

$p_1$ and $p_2$ are predetermined proportional terms;

Correction is the correction factor;

$X_n$ is the position of the diaphragm 130;

$d_1$ is the derivative error term; and $Velocity_{n-1}$ is the velocity of the diaphragm 130.

As shown in the above equation, the controller 122 can limit the corrected voice coil current based on the predetermined limit for the position of the diaphragm 130. This can reduce the effect of errors in the position of the diaphragm 130, especially for cumulative errors when the position of the diaphragm 130 is calculated using dead reckoning techniques.

At 410, the controller 122 can determine the velocity of the diaphragm 130. The velocity of the diaphragm can be determined based on the corrected voice coil current and the system spring factor. For example, the velocity of the diaphragm 130 can be determined using the following formula:

$$\text{Velocity}_n = dt * \frac{Bl(x_{n-1}) * I_{vc} - \text{Velocity}_{n-1} * R_{ms} - x_{n-1} * K_{system}}{m_{ms}} + \text{Velocity}_{n-1}$$

where $\text{Velocity}_n$ is the velocity of the diaphragm 130 corresponding to the current position of the diaphragm 130;

dt is the timespan of the time step;

$Bl(x_{n-1})$ is motor force factor corresponding to the previous position of the diaphragm 130;

$I_{vc}$ is the corrected voice coil current;

$R_{ms}$ is the damping factor;

$x_{n-1}$ is the previous position of the diaphragm 130

$K_{system}$ is the system spring factor;

$m_{ms}$ is the mass of the mass; and $\text{Velocity}_{n-1}$ is the velocity of the diaphragm 130 corresponding to the previous position of the diaphragm 130.

In some embodiments, the controller 122 can determine the position of the diaphragm 130 based on the velocity of the diaphragm 130. In particular, the controller 122 can determine the position of the diaphragm 130 based on the velocity of the diaphragm 130 and the previous position of the diaphragm 130. For example, the position of the diaphragm 130 can be determined using the following equation:

$$x_n = dt * \text{Velocity}_n + x_{n-1}$$

where $x_n$ is the current position of the diaphragm 130;

dt is the timespan of the time step;

$\text{Velocity}_n$ is the velocity of the diaphragm 130; and $x_{n-1}$ is the previous position of the position of the diaphragm 130.

In various embodiments, this determined position of the diaphragm 130 may be then be used as the determined position of the diaphragm 130 in the subsequent iteration at 404.

At 412, optionally, the controller 122 can determine the corrected voice coil voltage. In some embodiments, step 412 may be omitted if a current source is used to apply the corrected voice coil current. Step 412 may be executed if a voltage source is used to apply the corrected voice coil voltage.

The controller 122 can determine the corrected voice coil voltage based on the corrected voice coil current, the motor force factor, and the velocity of the diaphragm 130. For example, the corrected voice coil voltage can be determined using the following equation:

$$V_{vc} = I_{vc} * R_{vc} + Bl(x_n) * \text{Velocity}_n$$

where $V_{vc}$ is the corrected voice coil voltage;

$I_{vc}$ is the corrected voice coil current;

$R_{vc}$ is the resistance of the voice coil 240;

$Bl(x_n)$ is the motor force factor; and $\text{Velocity}_n$ is the velocity of the diaphragm 130.

At 414, the controller 122 can apply the corrected audio signal to the voice coil 240. In some embodiments, the controller 122 may apply the voice coil voltage to the voice coil 240 as the corrected audio signal, for example, using a voltage source. In other embodiments, the controller 122 may apply the voice coil current to the voice coil 240, for example, using a current source. That is, the controller 122 can apply a control signal having the corrected voice coil voltage or current to the voice coil 240. For example, the controller 122 may generate the corrected voice coil voltage or current using a voltage or current supplied by the power source 120. In response to the corrected audio signal, the voice coil 240 can move the diaphragm 130 to generate sound corresponding to the input audio signal. Correcting the signal applied to the voice coil 240 using the method 400 can reduce the distortions caused by nonlinear characteristics of the acoustic transducer system 100 and back electromotive voltage so that the sound generated by the acoustic transducer system 100 can more closely correspond to the sound represented by the input audio signal.

Subsequent to 414, the method 400 can repeat so that steps 402 to 414 can be executed yet again. For example, at 402, the controller 122 can receive a subsequent input audio signal. At 404, the controller 122 can determine a subsequent position of the diaphragm 130. At 406, the controller 122 can determine a subsequent correction factor, a subsequent motor force factor, a subsequent spring error factor, and a subsequent system spring factor based on the subsequent position of the diaphragm. At 408, the controller 122 can determine a subsequent corrected voice coil current based on the subsequent input audio signal, the subsequent correction factor, the subsequent spring error factor, the previous velocity of the diaphragm, and the previous position of the diaphragm. At 410, the controller 122 can determine a subsequent velocity of the diaphragm based on the subsequent corrected voice coil current, the subsequent system spring factor, the previous motor force factor, the previous velocity of the diaphragm, and the previous position of the diaphragm. At 412, optionally, the controller 122 can determine a subsequent corrected voice coil voltage based on the subsequent corrected voice coil current, the subsequent motor force factor, and the subsequent velocity of the diaphragm. At 414, the controller 122 can apply the subsequent corrected audio signal to the voice coil 240. For example, the controller 122 may apply the corrected voice coil current or the corrected voice coil voltage to the voice coil 240.

Figure 7:
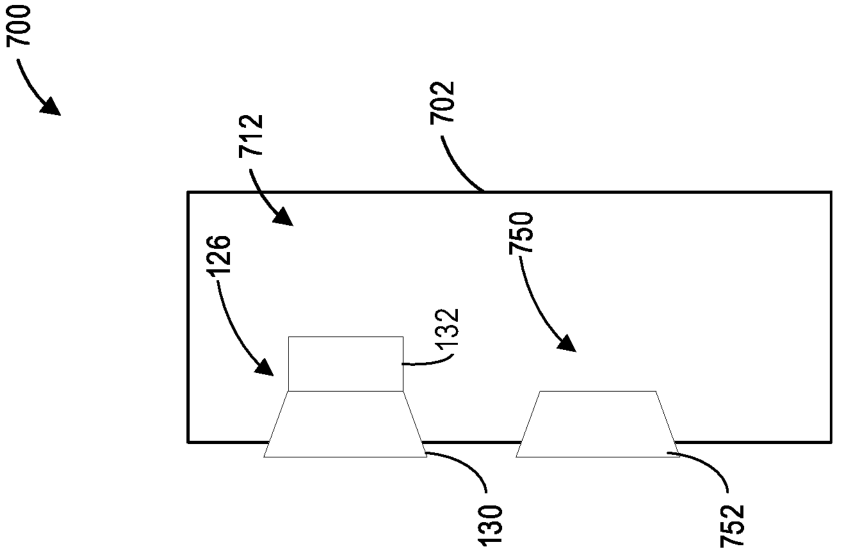
FIG. 7 is a cross-sectional view of another example acoustic transducer system, in accordance with an embodiment.

Referring now to FIG. 7, there is shown another example acoustic transducer system 100. The acoustic transducer system 700 includes a driver 126 and a passive radiator 750. The driver 126 and passive radiator 750 are housed in an enclosure 702. The enclosure 702 contains a volume of air 712.

The driver 126 includes a driver magnetic component 132 and an active diaphragm 130. Similar to the acoustic transducer system 100, the diaphragm 130 can be driven by a voice coil (not shown) fixed to the diaphragm 130 when the voice coil receives a control signal from a controller (also not shown). The voice coil can move relative to the driver magnetic component 132, thereby actively driving the diaphragm 130.

The passive radiator 750 includes a passive diaphragm 752. Unlike the active diaphragm 130, the passive diaphragm 752 is not coupled to a voice coil that is driven by a control signal, and the passive radiator 750 does not include a driver magnetic component 132. Instead, the passive diaphragm 752 moves in response to the movement of the active diaphragm 130 to produce sound. In particular, the movement of the active diaphragm 130 can increase or decrease the volume of air 712 inside the enclosure 702, thereby increasing or decreasing the air pressure inside the enclosure 702. The change in air pressure of the enclosure 702 can move the passive diaphragm 752.

Figure 8:
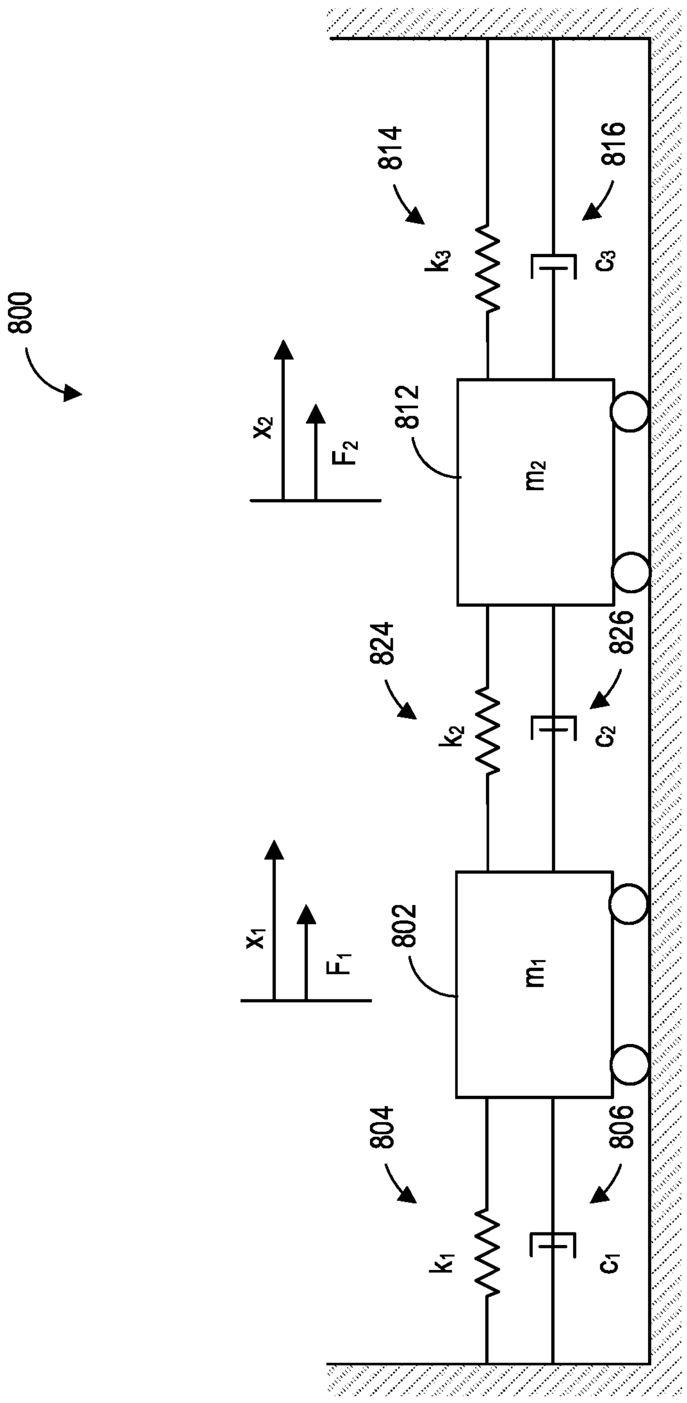
FIG. 8 is a diagram of another example model of an acoustic transducer system, in accordance with an embodiment.

Referring now to FIG. 8, there is shown another example model 800 for an acoustic transducer system 700 having a driver 126 and a passive radiator 750. As shown, the model 800 can represent the acoustic transducer system 700 as a dampened spring system. More specifically, the model 800 can represent the driver 126 as a mass 802 having a mass $m_1$, a spring 804 having a spring factor $k_1$, and a damper 806 having a damping factor $c_1$. Similarly, the model 800 can represent the passive radiator 750 as a mass 812 having a mass $m_2$, a spring 814 having a spring factor $k_3$, and a damper 806 having a damping factor $c_3$. The masses 802 and 812 can represent the respective masses of the diaphragms 130 and 752 (and the voice coil 240 for the driver 126); the springs 804 and 814 can represent the respective stiffnesses of the diaphragms 130 and 752; and the dampers 806 can represent the respective mechanical losses of the driver 126 and the passive radiator 750.

The acoustic coupling between the driver 126 and the passive radiator 750 (i.e., by the air 712 within the enclosure 702) can be represented as a spring 824 having a spring factor $k_2$ and a damper 826 having damping factor $c_2$. In various embodiments, the mechanical losses of the air can be approximated as zero, and the coupling can be represented by a spring 824 without a damper 826. The coupling spring factor $k_2$ can represent the stiffness of the air 712 within the enclosure 702 and may depend on the surface areas of the diaphragms 130 and 752 and the instantaneous volume of the enclosure 702.

The forces $F_1$ and $F_2$ applied to the respective masses 802 and 812 can be represented by the following equations:

$$m_1x_1 + (c_1 + c_2)x_1 - c_2x_2 + (k_1 + k_2)x_1 - k_2x_2 = F_1$$

$$m_2x_2 - c_2x_1 + (c_2 + c_3)x_2 - k_2x_1 + (k_2 + k_3)x_2 = F_2$$

During operation, the force $F_1$ applied to the mass 802 for the driver 126 is the motor force (i.e., when a signal is applied to the voice coil 240 to move the voice coil 240) Bl(x)*Ivc. The force $F_2$ applied to the mass 812 for the passive radiator 750 can be assumed to be zero. These equations can be rearranged and combined with other equations to solve for various aspects of the acoustic transducer system 700.

Figure 9:
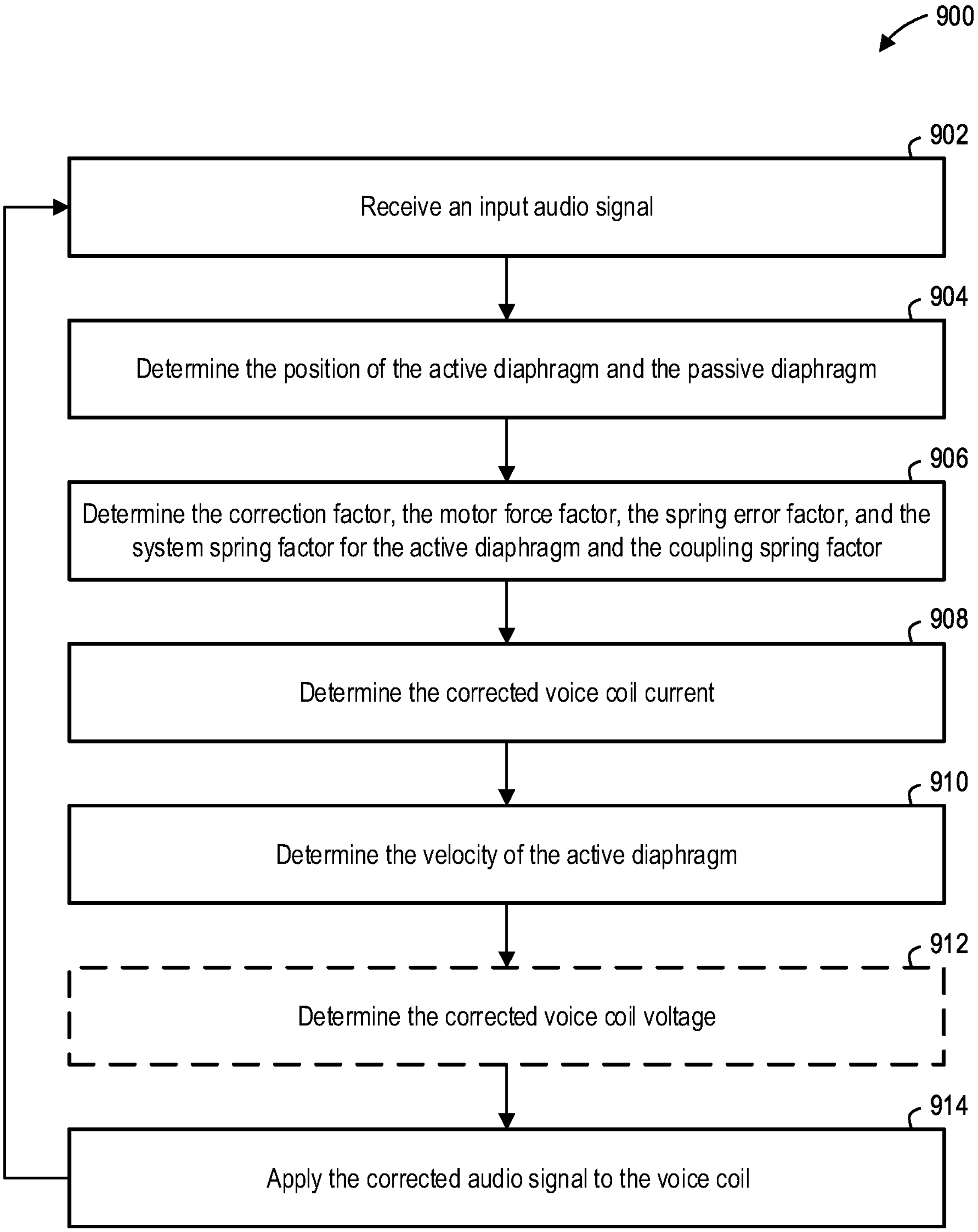
FIG. 9 is a flow chart of an example method of operating an acoustic transducer system, in accordance with an embodiment.

Referring now to FIG. 9, there is shown another example method 900 for operating an acoustic transducer system 700. The method 900 can be used to produce output audio signals that compensate for the distortions associated with non-linear characteristics of an acoustic transducer system 700 having a driver 126 and a passive radiator. The method 900 can involve determining various parameters of the acoustic transducer system 700 based on a model 800 of the acoustic transducer system 700. Similar to method 400, the method 900 can be iterative so that steps 902 to 914 are executed more than once. The frequency at which the method 900 is executed can vary depending on the intended application of the particular acoustic transducer system 100. Similar to method 400, the method 900 can involve determining various parameters of the acoustic transducer system 700 associated with the current iteration based on one or more parameters associated with a previous iteration and initially assigning one or more of the parameters a predetermined assumed value during the first iteration.

As shown, the method 900 can begin at 902. At 902, a controller 122 can receive an input audio signal.

At 904, the controller 122 can determine the position of the active diaphragm 130 of the driver 126 and the position of the passive diaphragm 752 of the passive radiator 750. In some embodiments, the controller 122 can receive the position of the active diaphragm 130 and/or the passive diaphragm 752 from one or more position sensors in electronic communication with the controller 122. In some embodiments, the controller 122 can determine the position of the active diaphragm 130 and/or the passive diaphragm 752 based on a previously calculated position of the active diaphragm 130 and/or the passive diaphragm 752.

The position the active diaphragm 130 and the passive diaphragm 752 can be determined in a similar manner as described herein with regard to method 400. For example, the controller 122 may determine the position of the passive diaphragm 752 based on a velocity of the passive diaphragm 752 and a previous position of the passive diaphragm 752.

At 906 the controller 122 can determine the correction factor, the motor force factor, the spring error factor, and the system spring factor for the active diaphragm 130. The controller 122 can determine the motor force factor, the spring error factor, and the system spring factor for the active diaphragm 130 in a similar manner as described herein with respect to method 400 (e.g., based on the position of the active diaphragm 130).

In various embodiments, the controller 122 may determine the system spring factor for the active diaphragm 130 based on the position of both the active diaphragm 130 and the passive diaphragm 752. In some embodiments, the controller 122 may determine the system spring factor for the active diaphragm 130 based on an enclosure spring factor for the active diaphragm 130 that is determined based on the volume of the enclosure 702. The controller 122 may determine the volume of the enclosure 702 based on the positions of the active diaphragm 130 and the passive diaphragm 752. For example, the volume of the enclosure 702 can be determined using the following formula:

$$\text{Volume}_{enclosure}(n-1) = \text{Volume}_{enclosure}(0) + S_{d_{TD}} * x1_{n-1} - S_{d_{PR}} * x2_{n-1}$$

where $\text{Volume}_{enclosure}$ (n−1) is the volume of the enclosure 702 corresponding to the previous position of the active diaphragm 130 and the passive diaphragm 752;

$\text{Volume}_{enclosure}$ (0) is the volume of the enclosure 702 corresponding to the initial position of the active diaphragm 130 and the passive diaphragm 752;

$S_{d_{TD}}$ is the surface area of the active diaphragm 130;

$S_{d_{PR}}$ is the surface area of the passive diaphragm 752;

$x_{1_{n-1}}$ is the previous position of the active diaphragm 130; and $x_{2_{n-1}}$ is the previous position of the passive diaphragm 752.

At 906 the controller 122 can also determine the coupling spring factor. The controller 122 can determine the coupling spring factor based on the position of the position of the active diaphragm 130 and the position of the passive diaphragm 752. For example, the coupling spring factor can be determined using the following formula:

$$K_{coupling} = S_{d_{TD}} * S_{d_{PR}} * c^2 * \text{Roe}_0/\text{Volume}_{enclosure}(n-1)$$

where $K_{coupling}$ is the coupling spring factor;

$S_{d_{TD}}$ is the surface area of the active diaphragm 130;

$S_{d_{PR}}$ is the surface area of the passive diaphragm 752;

c is the speed of sound.

$\text{Roe}_0$ is the density of air; and $\text{Volume}_{enclosure}$ (n−1) is the volume of the enclosure 702 corresponding to the previous position of the active diaphragm 130 and the passive diaphragm 752

At 908, the controller 122 can determine the corrected voice coil current. The controller 122 can determine the corrected voice coil current in a similar manner as described herein with respect to method 400 (e.g., based on the input audio signal, the correction factor, the spring error factor, and the velocity of the active diaphragm 130).

At 910, the controller 122 can determine the velocity of the active diaphragm 130. Similar to method 400, the velocity of the active diaphragm 130 can be determined based on on the corrected voice coil current and the system spring factor for the active diaphragm 130. However, in contrast to method 400, the velocity of the active diaphragm 130 can be determined based also on the coupling spring factor. For example, the velocity of the active diaphragm 130 can be determined using the following formula:

$$\text{Velocity}_{TD_n} = dt * \frac{Bl(x_{1_{n-1}}) * I_{vc} - \text{Velocity}_{TD_{n-1}} * R_{ms_{TD}} - x_{1_{n-1}} * K_{system_{TD}} + K_{coupling} * x_{2_{n-1}}}{m_{ms_{TD}}} + \text{Velocity}_{TD_{n-1}}$$

where $\text{Velocity}_{TD_n}$ is the velocity of the active diaphragm 130 corresponding to the current position of the active diaphragm 130;

dt is the timespan of the time step;

$\text{Bl}(x_{1_{n-1}})$ is motor force factor corresponding to the previous position of the active diaphragm 130;

$l_{vc}$ is the corrected voice coil current;

$R_{ms_{TD}}$ is the damping factor for the driver 126;

$x_{1_{n-1}}$ is the previous position of the active diaphragm 130

$K_{system_{TD}}$ is the system spring factor for the driver 126;

$m_{ms}$ is the mass of the mass for the driver 126;

$K_{coupling}$ is the coupling spring factor;

$x_{2_{n-1}}$ is the previous position of the passive diaphragm 752; and $\text{Velocity}_{TD_{n-1}}$ is the velocity of the active diaphragm 130 corresponding to the previous position of the active diaphragm 130.

In some embodiments, the controller 122 may also determine the velocity of the passive diaphragm 752. The controller 122 can determine the velocity of the passive diaphragm 752 based on the system spring factor for the passive diaphragm 752 and the coupling spring factor. For example, the velocity of the active diaphragm 130 can be determined using the following formula:

$$\text{Velocity}_{PR\_n} = dt * \frac{-\text{Velocity}_{PR\_n-1} * R_{ms_{PR}} - x_{2_{n-1}} * K_{system_{PR}} + K_{coupling} * x_{1_{n-1}}}{m_{ms_{PR}}} + \text{Velocity}_{PR_{n-1}}$$

where $\text{Velocity}_{PR_n}$ is the velocity of the passive diaphragm 752 corresponding to the current position of the passive diaphragm 752;

dt is the timespan of the time step;

$R_{ms_{PR}}$ is the damping factor for the passive radiator 750;

$x_{1_{n-1}}$ is the previous position of the active diaphragm 130

$K_{system_{PR}}$ is the system spring factor for the passive radiator 750;

$m_{ms_{PR}}$ is the mass of the mass for the passive radiator 750;

$K_{coupling}$ is the coupling spring factor;

$x_{2_{n-1}}$ is the previous position of the passive diaphragm 752; and $\text{Velocity}_{PR_{n-1}}$ is the velocity of the passive diaphragm 752 corresponding to the previous position of the passive diaphragm 752.

In some embodiments, the controller 122 can determine the position of the active diaphragm 130 based on the velocity of the active diaphragm 130 and the previous position of the active diaphragm 130 (e.g., in a similar manner as described herein with respect to method 400). Likewise, the controller 122 may determine the position of the passive diaphragm 752 based on the velocity of the passive diaphragm 752 and the previous position of the passive diaphragm 752. In various embodiments, this determined position of the active diaphragm 130 and the passive diaphragm 752 may be then be used as the determined position of the active diaphragm 130 and the passive diaphragm 752 in the subsequent iteration at 904.

The controller 122 can determine the system spring factor for the passive diaphragm 752 in a similar manner as the system spring factor for the driver 126 (e.g., based on the position of the passive diaphragm 752). In particular, the system spring factor for the passive diaphragm 752 can be determined based on the enclosure spring factor for the passive diaphragm 752 and a suspension spring factor for the passive diaphragm 752. For example, system spring factor for the passive diaphragm 752 can be determined using the following formula:

$$K_{system_{PR}} = K_{enclosure_{PR}} + K_{ms_{PR}}$$

where $K_{enclosure_{PR}}$ is the enclosure spring factor for the passive radiator 750; and $K_{ms_{PR}}$ is the suspension spring factor for the passive radiator 750.

The controller 122 can determine the enclosure spring factor for the passive diaphragm 752 in a similar manner as the enclosure spring factor for the driver 126 (e.g., based on the volume of the enclosure 702). For example, the enclosure spring factor for the passive diaphragm 752 can be determined using the following formula:

$$K_{enclosure_{PR}} = S_{d_{PR}}^2 * c^2 * \text{Roe}_0/\text{Volume}_{enclosure}(n-1)$$

where $S_{d_{PR}}$ is the surface area of the passive diaphragm 752;

c is the speed of sound.

$\text{Roe}_0$ is the density of air; and $\text{Volume}_{enclosure}$ (X-1) is the volume of the enclosure 702 corresponding to the previous position of the active diaphragm 130 and passive diaphragm 752.

At 912, optionally, the controller 122 can determine the corrected voice coil voltage. The controller 122 can determine the corrected voice coil voltage in a similar manner as described herein with respect to method 400 (e.g., based on the corrected voice coil current, the motor force factor, and the velocity of the active diaphragm 130). Step 912 may be omitted if a current source is used to apply the corrected voice coil current. Step 912 may be executed if a voltage source is used to apply the corrected voice coil voltage.

At 914, the controller 122 can apply the corrected audio signal to the voice coil 240. As described herein, the controller 122 may apply the corrected voice coil current using a current source or the corrected voice coil voltage using a voltage source. Correcting the signal applied to the voice coil 240 using the method 900 can reduce the distortions caused by nonlinear characteristics and back electromotive voltage of the acoustic transducer system 700 so that the sound generated by the acoustic transducer system 700 can more closely correspond to the sound represented by the input audio signal.

Subsequent to 914, the method 900 can repeat so that steps 902 to 914 can be executed yet again. Various parameters of the acoustic transducer system 700 can be determined based on a parameter value determined during a previous iteration.

Figure 10:
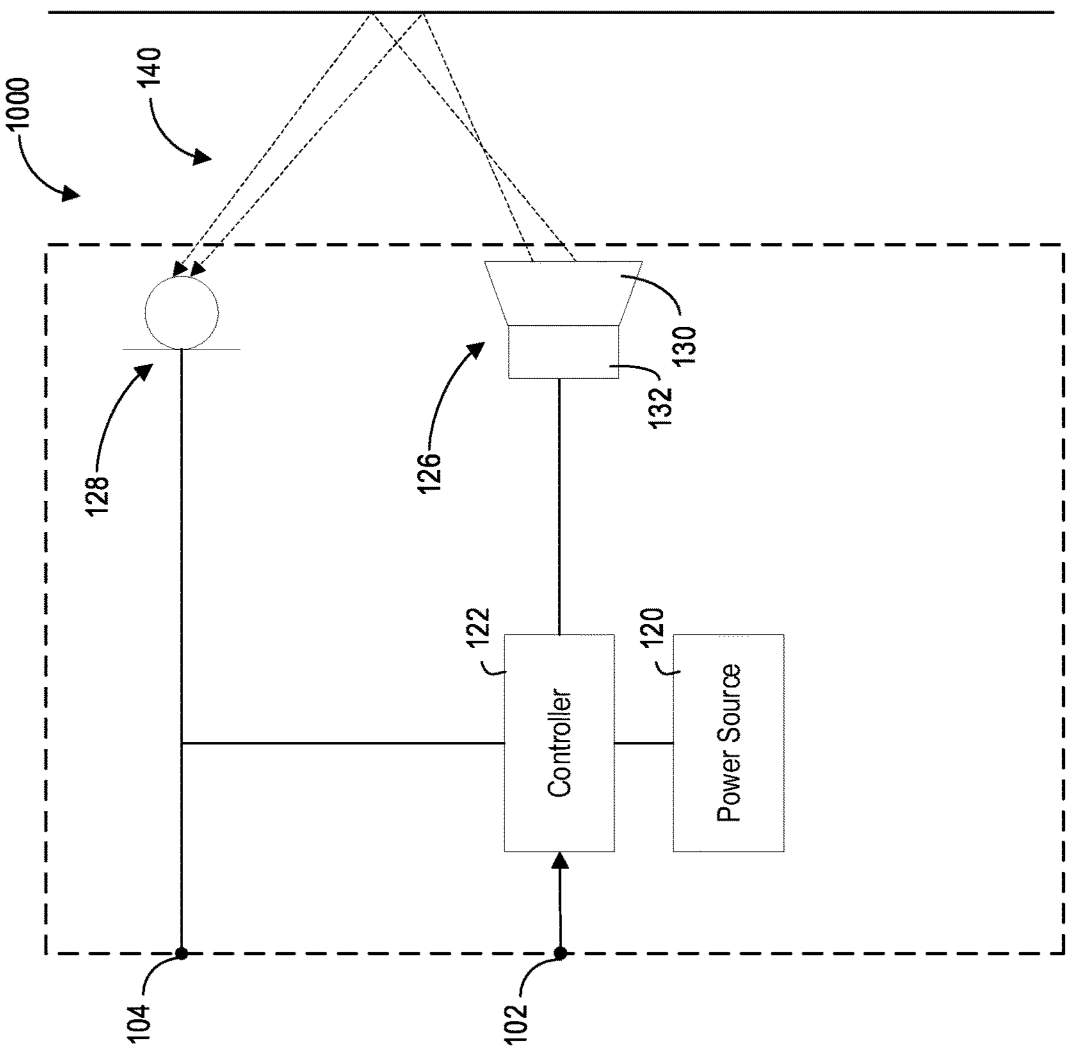
FIG. 10 is a block diagram of an example acoustic transducer system, in accordance with an embodiment.

Referring to FIG. 10, there is shown another example acoustic transducer system 1000. Like the acoustic transducer system 100 shown in FIG. 1, the acoustic transducer system 1000 includes a controller 122 in electronic communication with a driver 126. As described herein, the controller 122 can receive input audio signals from input terminal 102 and provide corrected audio signals to the driver 126 using power source 120. However, in contrast to the acoustic transducer system 100 shown in FIG. 1, the acoustic transducer system 1000 further includes a microphone 128.

Microphone 128 can convert sound into audio signals that are output at an output terminal 104. However, because the microphone 128 may be proximate to the driver 126, the microphone 128 may receive sound 140 that is generated from the driver 126. In many cases, it is undesirable for the microphone 128 to receive sound from the driver 126. For example, for smart speaker systems that detect when a user utters a specific "wake up" word, this may require the smart speaker system to isolate the user's voice from the output of the speaker.

Various Echo Loss Return Enhancement (ERLE) methods may be used to correct microphone audio signals by removing the sounds 140 produced by the driver 126 to improve "barge-in" performance. In some embodiments, the controller 122 may correct the microphone audio signals using the corrected voice coil voltage or current. In this way, the controller 122 can provide an adaptive filter for the microphone audio signals. For example, the controller 122 may subtract the voice coil voltage or current from the microphone audio signal using various frequency and time adjustments to provide a corrected microphone signal at the output terminal 104. Using the corrected voice coil voltage or current may provide a better corrected microphone signal, since the corrected voice coil voltage or current takes into account the non-linearities and distortions of the driver 126.

In other embodiments, the controller 122 may not correct the input audio signals provided to the driver 126. That is, uncorrected input audio signals (i.e., as received at input terminal 102) can be supplied to the driver 126. This may be desirable because the uncorrected input audio signals may result in a louder output by the driver 126. The controller 122 can determine the distortion of the driver 126 as a result of using the uncorrected input audio signals and correct the microphone audio signals. An example method of correcting the microphone audio signals will now be described with regard to FIG. 11.

Figure 11:
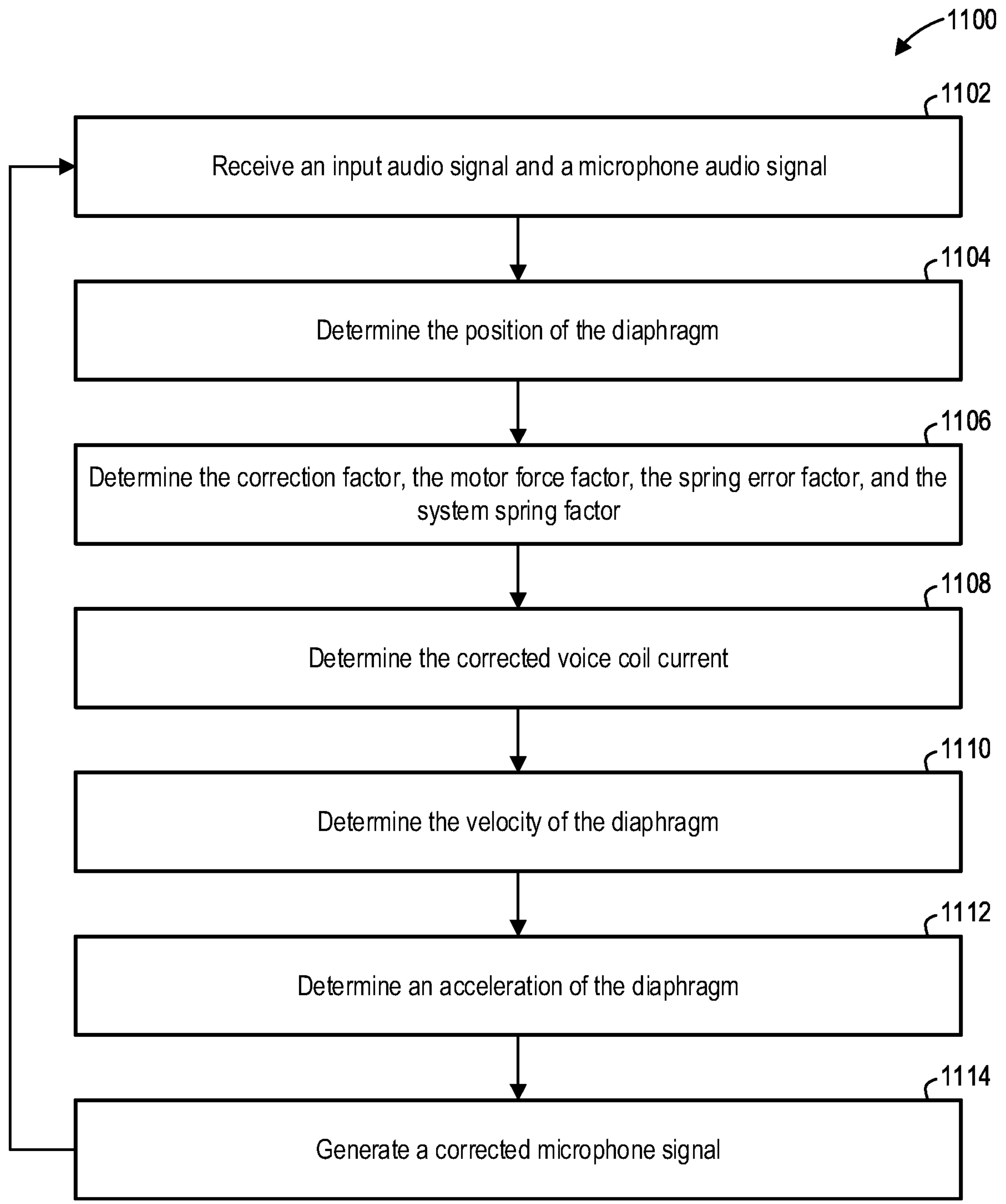
FIG. 11 is a flow chart of an example method of operating an acoustic transducer system, in accordance with an embodiment.

Referring to FIG. 11, there is shown another example method 1100 of operating an acoustic transducer system 1000. The method 1100 can be used to produce corrected microphone signals that compensate for speaker output, which may contain distortions associated with non-linear characteristics of an acoustic transducer system 1000. The method 1100 can involve determining various parameters of the acoustic transducer system 1000 based on a model of the acoustic transducer system 1000. Similar to method 400 and 900, the method 1100 can be iterative so that steps 1102 to 1114 are executed more than once. The frequency at which the method 1100 is executed can vary depending on the intended application of the particular acoustic transducer system 1000. Similar to method 400 and 900, the method 1100 can involve determining various parameters of the acoustic transducer system 1000 associated with the current iteration based on one or more parameters associated with a previous iteration and initially assigning one or more of the parameters a predetermined assumed value during the first iteration.

At 1102, the controller 122 can receive an input audio signal. For example, the controller 122 can receive an input audio signal from the input terminal 102. The controller 122 can apply the input audio signal to the driver 126. In response, the driver 126 can produce sound 140, which is received by microphone 128. The controller 122 can then receive a microphone audio signal, which may contain the sound 140 produced by the driver 126.

At 1104, the controller 122 can determine the position of the diaphragm 130. In some embodiments, the controller 122 can receive the position of the diaphragm 130 from one or more position sensors in electronic communication with the controller 122. In some embodiments, the controller 122 can determine the position of the diaphragm 130 based on a previously calculated position of the diaphragm 130. The position the diaphragm 130 can be determined in a similar manner as described herein with regard to method 400. For example, the controller 122 may determine the position of the diaphragm 130 based on a velocity of the diaphragm 130 and a previous position of the diaphragm 130.

At 1106, the controller 122 can determine the correction factor, the motor force factor, the spring error factor, and the system spring factor for the diaphragm 130. The controller 122 can determine the motor force factor, the spring error factor, and the system spring factor for the diaphragm 130 in a similar manner as described herein with respect to method 400 (e.g., based on the position of the active diaphragm 130).

At 1108, the controller 122 can determine the corrected voice coil current. The controller 122 can determine the corrected voice coil current in a similar manner as described herein with respect to method 400 (e.g., based on the input audio signal, the correction factor, the spring error factor, and the velocity of the diaphragm 130).

At 1110, the controller 122 can determine the velocity of the diaphragm 130. The controller 122 can determine the corrected voice coil current in a similar manner as described herein with respect to method 400 (e.g., based on on the corrected voice coil current and the system spring factor for the active diaphragm 130.)

At 1112, the controller 122 can determine the acceleration of the diaphragm 130. In various embodiments, the controller 122 can determine the acceleration of the diaphragm 130 based on the velocity of the diaphragm 130. For example, the controller 122 may determine the acceleration based on a change in the velocity over time. For instance, the controller 122 may compare a current velocity with a previous velocity to determine the acceleration.

At 1114, the controller 122 can generate a corrected microphone signal. The corrected microphone signal can be generated based on the microphone audio signal and the acceleration of the diaphragm 130. The acceleration of the diaphragm 130 is generally proportional to the sound produced by the driver 126 and therefore can be used to subtract the sound produced by the driver 126. As a result, the corrected microphone signal effectively corrects the microphone audio signal to remove the sound generated by diaphragm 130. The corrected microphone signal can then be output at output terminal 104.

Subsequent to 1114, the method 1100 can repeat so that steps 1102 to 1114 can be executed yet again. Various parameters of the acoustic transducer system 1000 can be determined based on a parameter value determined during a previous iteration.

In some embodiments, the controller 122 may adjust one or more of the parameters based on the received microphone audio signal corresponding to the sound 140 received by microphone 128. In particular, the controller 122 may compare the received microphone audio signal with an expected microphone audio signal and adjust the one or more parameters based on a difference between the signals. The expected microphone audio signal may be determined based on the expected sound 140 generated from the driver 126. For example, the controller 122 may determine the expected microphone signal based on the acceleration of the diaphragm 130 (which is generally proportional to the sound produced by the driver 126). In various embodiments, the parameters may initially be typical or average parameters derived from production statistics for similar transducer systems, which can then be subsequently adjusted based on the actual response of the driver 126 and the microphone 128.

Various parameters can be adjusted based on the received microphone audio signal. For example, the adjusted parameters may include the voice coil resistance $R_{vc}$. As another example, the adjusted parameters may include the suspension spring factor $K_{ms}$. For instance, the adjusted parameters may include the suspension spring factor corresponding to when the diaphragm 130 is at the initial position $K_{ms}$ (0). In yet other examples, the adjusted parameters may include the motor force factor Bl(x). For instance, the adjusted parameters may include the zero position of the motor force factor Bl(0). This may function as an offset that shifts the motor force factor curve (e.g., shifting the plot left or right in FIG. 5, or shifting the physical position of the voice coil 240 in or out). The adjusted parameters may also include one or more of the coefficients of the polynomial fit of the motor force factor, such as a first order coefficient, which may tilt the motor force factor curve (e.g., tilting the plot in FIG. 5).

The parameters can be adjusted initially when the acoustic transducer system 1000 is first initiated (e.g., during the first iteration), or throughout operation (e.g., during subsequent iterations). In this manner, the adjusted parameters can improve the accuracy of the non-linear distortion compensation described herein for different samples, over time, in different environments, for different production process, etc.

In some embodiments, the parameters may be adjusted based on data received from one or more external devices. For example, in some cases, the controller 122 may be connected to a network, such as the Internet, and receive the data from an external device, such as a computer server, over the network. In this manner, the acoustic transducer system 1000 can be upgraded over time, as new data is provided and used to adjust the parameters to improve accuracy of the non-linear distortion compensation. Various data can be transmitted to the controller 122 to adjust the parameters. In some embodiments, the data may include typical or average parameters derived from production statistics for similar transducer systems.

In some embodiments, the various non-linear distortion compensation methods described herein can be applied to an existing transducer system by upgrading or retrofitting the existing system using software upgrades. The existing system may include a controller, a driver, and a microphone, like the acoustic transducer system 1000, except that the controller of the existing system may lack the functionality to perform non-linear distortion compensation. The existing system may be upgraded to provide such functionality by providing software upgrades to reconfigure the operation of the controller of the existing system. For example, the controller may be connected to a network, such as the Internet, and may be able to receive the software upgrades from an external device, such as a computer server.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. An acoustic transducer system, comprising:
- a driver magnetic structure operable to generate a magnetic flux;
- a voice coil operable to move in response to the magnetic flux;
- a diaphragm fixed to the voice coil and operable to generate sound when moved;
- a microphone proximate to the diaphragm; and
- a controller in electronic communication with the voice coil and the microphone and operable to:
  - receive an input audio signal;
  - determine a position of the diaphragm;
  - determine a correction factor and a spring error factor based at least on the position of the diaphragm;

determine a corrected voice coil current based at least on the input audio signal, the correction factor and the spring error factor;

receive a microphone audio signal from the microphone; and generate a corrected microphone signal based at least on the microphone audio signal, wherein the corrected microphone signal corrects the microphone audio signal to remove the sound generated by the diaphragm.

2. The system of claim 1, wherein the controller is operable to:

determine a motor force factor based at least on the position of the diaphragm.

3. The system of claim 1, wherein the controller is operable to:

determine a system spring factor based at least on the position of the diaphragm; and determine the corrected voice coil current based at least on the system spring factor.

4. The system of claim 3, wherein the controller is operable to:

determine a velocity of the diaphragm;

determine the corrected voice coil current based at least on the velocity of the diaphragm; and determine the velocity of the diaphragm based at least on the corrected voice coil current and the system spring factor.

5. The system of claim 4, wherein the controller is operable to:

determine an acceleration of the diaphragm based at least on the velocity of the diaphragm; and generate the corrected microphone signal based at least on the acceleration of the diaphragm.

6. The acoustic transducer system of claim 5, wherein the controller is operable to:

determine an expected microphone signal based on the acceleration of the diaphragm;

compare the received microphone audio signal to the expected microphone audio signal; and adjust at least one parameter used to determine the acceleration of the diaphragm based on a difference between the received microphone audio signal to the expected microphone audio signal.

7. The acoustic transducer system of claim 6, wherein adjusting the at least one parameter comprises adjusting a zero position of a motor force factor.

8. A method of operating an acoustic transducer system, comprising:

receiving an input audio signal;

determining a position of a diaphragm;

determining a correction factor and a spring error factor based at least on a position of the diaphragm;

determining a corrected voice coil current based at least on the input audio signal, the correction factor, the spring error factor, and a velocity of the diaphragm;

receiving a microphone audio signal from a microphone proximate to the diaphragm; and generating a corrected microphone signal based at least on the microphone audio signal, wherein the corrected microphone signal corrects the microphone audio signal to remove the sound generated by the diaphragm.

9. The method of claim 8, further comprising:

determining a motor force factor based at least on the position of the diaphragm.

10. The method of claim 8, further comprising:

determining a system spring factor based at least on the position of the diaphragm; and determining the corrected voice coil current based at least on the system spring factor.

11. The method of claim 10, further comprising:

determining a velocity of the diaphragm;

determining the corrected voice coil current based at least on the velocity of the diaphragm; and determining the velocity of the diaphragm based at least on the corrected voice coil current and the system spring factor.

12. The method of claim 11, wherein the controller is operable to:

determining an acceleration of the diaphragm based at least on the velocity of the diaphragm; and generating the corrected microphone signal based at least on the acceleration of the diaphragm.

13. The method of claim 12, further comprising:

determining an expected microphone signal based on the acceleration of the diaphragm;

comparing the received microphone audio signal to the expected microphone audio signal; and adjusting at least one parameter used to determine the acceleration of the diaphragm based on a difference between the received microphone audio signal to the expected microphone audio signal.

14. The method of claim 13, wherein adjusting the at least one parameter comprises adjusting a zero position of a motor force factor.

* * * * *